US009065767B2

(12) United States Patent
Dong et al.

(10) Patent No.: US 9,065,767 B2
(45) Date of Patent: Jun. 23, 2015

(54) SYSTEM AND METHOD FOR REDUCING NETFLOW TRAFFIC IN A NETWORK ENVIRONMENT

(75) Inventors: Xuanming Dong, Cupertino, CA (US); Cesare Cantu', Santa Clara, CA (US); Jeffrey Y M Wang, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 279 days.

(21) Appl. No.: 13/438,113

(22) Filed: Apr. 3, 2012

(65) Prior Publication Data

US 2013/0262703 A1     Oct. 3, 2013

(51) Int. Cl.
  *G06F 15/16*     (2006.01)
  *H04L 12/811*    (2013.01)
  *H04L 29/06*     (2006.01)

(52) U.S. Cl.
  CPC ............. *H04L 47/38* (2013.01); *H04L 69/04* (2013.01)

(58) Field of Classification Search
  CPC ... H04L 41/0226; H04L 43/106; H04L 69/04; H04L 63/1416
  USPC .......................................... 707/693; 709/247
  See application file for complete search history.

(56) References Cited

U.S. PATENT DOCUMENTS

| | | | | |
|---|---|---|---|---|
| 6,128,279 | A * | 10/2000 | O'Neil et al. ................ | 370/229 |
| 6,640,244 | B1 * | 10/2003 | Bowman-Amuah .......... | 709/207 |
| 7,643,486 | B2 * | 1/2010 | Belz et al. ..................... | 370/392 |
| 7,839,847 | B2 * | 11/2010 | Nadeau et al. ................ | 370/389 |
| 7,911,975 | B2 * | 3/2011 | Droz et al. .................... | 370/254 |
| 8,015,315 | B2 * | 9/2011 | Chiang et al. ................ | 709/238 |
| 8,095,635 | B2 * | 1/2012 | Wang et al. ................... | 709/223 |
| 8,125,920 | B2 * | 2/2012 | Aitken et al. ................. | 370/252 |
| 8,274,895 | B2 * | 9/2012 | Rahman et al. ............... | 370/235 |
| 8,510,830 | B2 * | 8/2013 | Reilly ............................. | 726/22 |
| 8,782,012 | B2 * | 7/2014 | Fusco et al. .................... | 707/673 |
| 2006/0248095 | A1 * | 11/2006 | Cozzani ........................ | 707/100 |
| 2006/0272018 | A1 * | 11/2006 | Fouant ............................ | 726/23 |
| 2009/0055420 | A1 * | 2/2009 | Phaal et al. ................... | 707/101 |
| 2010/0085891 | A1 * | 4/2010 | Kind et al. .................... | 370/253 |
| 2010/0217837 | A1 * | 8/2010 | Ansari et al. ................. | 709/218 |
| 2010/0262650 | A1 * | 10/2010 | Chauhan et al. ............. | 709/203 |
| 2011/0270855 | A1 * | 11/2011 | Antonysamy ................ | 707/756 |
| 2012/0101975 | A1 * | 4/2012 | Khosravy ....................... | 706/55 |
| 2012/0330908 | A1 * | 12/2012 | Stowe et al. .................. | 707/693 |
| 2013/0041934 | A1 * | 2/2013 | Annamalaisami et al. ... | 709/203 |

(Continued)

OTHER PUBLICATIONS

R. Fonseca, et al., "On the Intrinsic Locality Properties of Web Reference Streams," Proceedings of IEEE Infocom 2003, San Franciso, CA, USA, Mar. 30-Apr. 3, 2003, 11 pages.

(Continued)

*Primary Examiner* — Kevin Bates
*Assistant Examiner* — Clarence D McCray
(74) *Attorney, Agent, or Firm* — Patent Capital Group

(57) ABSTRACT

A an example method includes building a dictionary between an exporter and a collector by encoding a first data record of a flow according to a dictionary template and exporting the first data record to the collector via a network communication. The method can also include compressing a second data record of the flow using the dictionary, where the compressing comprises encoding the second data record according to an encoding template; and exporting the second data record to the collector to be decompressed using the dictionary.

20 Claims, 11 Drawing Sheets

(56) References Cited

U.S. PATENT DOCUMENTS

2013/0073573 A1* 3/2013 Huang et al. ............... 707/755
2013/0262703 A1* 10/2013 Dong et al. ............... 709/247

OTHER PUBLICATIONS

Cisco Systems, Inc., "Introduction to Cisco IOS® Flexible NetFlow," White Paper, © 2006, 2008, 21 pages.

"Net Flow Services Solutions Guide ," Jan. 22, 2007, 72 pages; http://www.cisco.com/en/US/docs/ios/solutions_docs/netflow/nfwhite.html.

J. Quittek et al., "Requirements for IP Flow Information Export (IPFIX)," RFC 3917, Oct. 2004, 34 pages.

B. Claise, "Cisco Systems NetFlow Services Export Version 9," RFC 3954, Oct. 2004, 30 pages.

B. Claise, "Specification of the IP Flow Information Export (IPFIX) Protocol for the Exchange of IP Traffic Flow Information," RFC 5101, Jan. 2008, 64 pages.

E. Boschi et al., "IP Flow Information Export (IPFIX) Implementation Guidelines," RFC 5153, Apr. 2008, 32 pages.

W. Gong, et al., "Self-Similarity and Long Range Dependence on the Internet: A Second Look at the Evidence, Origins and Implications," Computer Networks, vol. 48, No. 3, Jun. 2005, 32 pages.

M. E. Crovella, and A. Bestavros, "Self-Similarity in World Wide Web Traffic: Evidence and Possible Causes," IEEE/ACM Transactions on Networking, vol. 5, No. 6, Dec. 1997, 25 pages.

\* cited by examiner

70(1) — 30(1) First Exported Entry

| Record 1 FlowSet ID 0x100 = 256 (Template ID) | Record 1 Length 0x001c = 28 Bytes |
|---|---|
| Record 1 - Field 1 value 0x21212121 = 33.33.33.33 (Source IPv4 Address) ||
| Record 1 - Field 2 value 0x2c2c2c2c = 44.44.44.44 (Destination IPv4 Address) ||
| Record 1 - Field 3 value 0x50 = 80 (Destination Port) | Record 1 - Field 4 value 0x1a00 (Ingress Ifindex) |
| Record 1 - Field 5 value 0x3fb3 = 16318 Bytes ||
| Record 1 - Field 6 value 0x00002233 ||
| Record 1 - Field 7 value 0x00003355 ||

70(2) — 30(2) Second Exported Entry

| Record 1 FlowSet ID 0x100 = 256 (Template ID) | Record 1 Length 0x001c = 28 Bytes |
|---|---|
| Record 1 - Field 1 value 0x21212121 = 33.33.33.33 (Source IPv4 Address) ||
| Record 1 - Field 2 value 0x2c2c2c2c = 44.44.44.44 (Destination IPv4 Address) ||
| Record 1 - Field 3 value 0x50 = 80 (Destination Port) | Record 1 - Field 4 value 0x1a00 (Ingress Ifindex) |
| Record 1 - Field 5 value 0x7f7c = 32636 Bytes ||
| Record 1 - Field 6 value 0x00003366 ||
| Record 1 - Field 7 value 0x00004455 || without Key Byte Compression

---

70(3) — 30(3) First Exported Entry

| Record 1 FlowSet ID 0x102 = 258 (Template ID) | Record 1 Length 0x0020 = 32 Bytes |
|---|---|
| Record 1 - Field 1 value 0x21212121 = 33.33.33.33 (Source IPv4 Address) ||
| Record 1 - Field 2 value 0x2c2c2c2c = 44.44.44.44 (Destination IPv4 Address) ||
| Record 1 - Field 3 value 0x50 = 80 (Destination Port) | Record 1 - Field 4 value 0x1a00 (Ingress Ifindex) |
| Record 1 - Field 5 value 0x3fb3 = 16318 Bytes ||
| Record 1 - Field 6 value 0x00002233 ||
| Record 1 - Field 7 value 0x00003355 ||
| Record 1 - Field 8 value 0x0007 | Padding 0x0000 |

70(4) — 30(4) Second Exported Entry

| Record 1 FlowSet ID 0x103 = 259 (Template ID) | Record 1 Length 0x0014 = 20 Bytes |
|---|---|
| Record 1 - Field 1 value 0x7f7c = 32636 Bytes ||
| Record 1 - Field 2 value 0x00003366 ||
| Record 1 - Field 3 value 0x00004455 ||
| Record 1 - Field 4 value 0x0007 | Padding 0x0000 | with Key Byte Compression

*FIG. 10*

SYSTEM AND METHOD FOR REDUCING NETFLOW TRAFFIC IN A NETWORK ENVIRONMENT

TECHNICAL FIELD

This disclosure relates in general to the field of communications and, more particularly, to a system and a method for reducing NetFlow traffic in a network environment.

BACKGROUND

The field of communications has become increasingly important in today's society. One area of importance associated with network communications relates to network routing. Routing protocols allow one or more components, devices, or modules to correctly direct information to its appropriate next destination. Certain paths or designated routes may be considered optimal or preferred over others. As traffic and subscriber base of end users increases, so too does the importance of efficient management of communication sessions and data flows. In particular, traffic flow characteristics can facilitate management of communication sessions by providing some idea to service providers about capacity considerations between network elements, packet loss characteristics in the network, or other network aspects to be considered.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 10 is a simplified diagram illustrating example details associated with an embodiment of the system;

DETAILED DESCRIPTION OF EXAMPLE EMBODIMENTS

Overview

Figure 1:
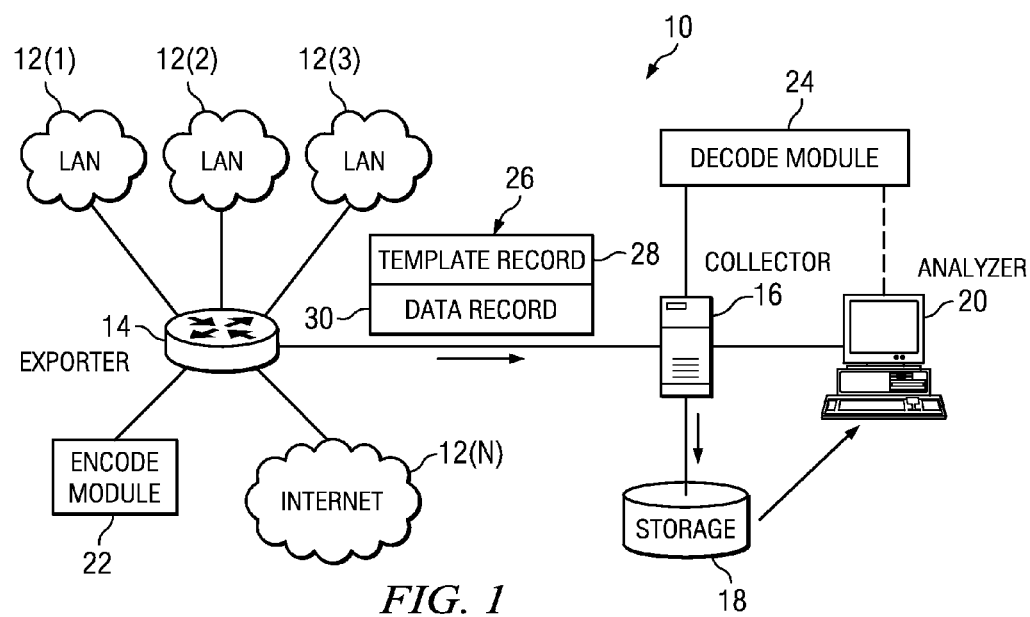
FIG. 1 is a simplified block diagram illustrating a system for migrating application virtual machines in a network environment.

An example method includes building a dictionary between an exporter and a collector by encoding a first data record of a flow according to a dictionary template and exporting the first data record to the collector via a network communication. The method can also include compressing a second data record of the flow using the dictionary, where the compressing comprises encoding the second data record according to an encoding template; and exporting the second data record to the collector to be decompressed using the dictionary.

In specific embodiments, the dictionary template includes a plurality of key fields, a plurality of non-key fields and an entry index field, and the encoding template includes the plurality of non-key fields and a key entry index field. Encoding the first data record according to the dictionary template can include populating the plurality of key fields, the plurality of non-key fields and the entry index field with a plurality of key bytes, a first plurality of non-key bytes, and an entry index value, respectively. Encoding the second data record according to the encoding template can include populating the plurality of non-key fields and the key entry index value field with a second plurality of non-key bytes and a key entry index value.

In other embodiments, the collector is configured for determining that the first data record is encoded according to the dictionary template, extracting a device key from the first data record, and updating the dictionary using a composite key comprising the device key, a template identification (ID) identifying the dictionary template, and the entry index value, wherein the updating comprises adding the plurality of key bytes to the dictionary. The collector is also configured for determining that the second data record is encoded according to the encoding template, extracting the device key from the second data record, looking up the dictionary using another composite key comprising the device key, another template ID identifying the encoding template, and the key entry index value, and substituting the key entry index value with the plurality of key bytes from the dictionary.

In other embodiments, the method further includes checking if a first entry in an aging table is to be aged out according to an aging criterion. The first entry can include the plurality of key bytes, the first plurality of non-key bytes, and the entry index value. In specific embodiments, if the first entry is to be aged out, the method includes copying the first entry to an exporting table, adding a first non-key field, a second non-key field, and a third non-key field to the first entry in the exporting table, wherein the first non-key field is set to 1, the second non-key field is set to 1, and the third non-key field is set to 0, exporting the first entry to the collector, and setting the second non-key field to 0 after exporting. In specific embodiments, the method further includes determining if the dictionary is to be updated at the collector, and if the dictionary is to be updated at the collector, encoding the first entry into the first data record before exporting.

In more specific embodiments, the method further includes checking if a second entry in the aging table is to be aged out according to the aging criterion. The second entry can include the plurality of key bytes, the second plurality of non-key bytes, and the entry index value. If the second entry is to be aged out, the method includes checking if a peer entry exists in the exporting table with the entry index value, if the peer entry exists, copying the second plurality of non-key bytes from the second entry to the peer entry, setting the first non-key field and the second non-key field in the peer entry to 0 and 1, respectively, after exporting the peer entry to the collector. In some embodiments, the peer entry is encoded according to the encoding template before exporting.

Example Embodiments

Turning to FIG. 1, FIG. 1 is a simplified block diagram illustrating a communication system 10 for reducing NetFlow traffic in a network environment in accordance with one example embodiment. As used herein, "NetFlow" includes any network protocol that can be used for collecting network traffic (e.g., Internet Protocol (IP) traffic) information. Such network protocols include, for example, NetFlow Services Export Version 9 as provided in Internet Engineering Task Force Request for Comments (RFC) 3954, and IP Flow Information Export (IPFIX) Protocol, as provided in RFC 5101. Further, network traffic includes IP flows passing through network elements. As used herein, the term "network element" is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

FIG. 1 illustrates one or more networks 12(1)-12(N) that communicate with an exporter 14. Exporter 14 may collect information about network packets flowing through networks 12(1)-12(N) and forward the information to a collector 16. Collector 16 may store the information in a storage 18, and/or may send the information to an analyzer 20 for analysis. Exporter 14 may be provisioned with an encode module 22 to facilitate reducing NetFlow traffic flowing from exporter 14 to collector 16. A corresponding decode module 22 may be provisioned in one or both of collector 16 and analyzer 20.

Networks 12(1)-12(N) may include observation points (not shown) where network packets (e.g., IP packets) may be observed. Examples of such observation points include a line to which a probe is attached, a shared medium (e.g., Ethernet-based Local Area Network (LAN)), a port of a router, or a set of physical or logical interfaces of a router, etc. Network packets may traverse each observation point during communication within and between networks 12(1)-12(N). The set of network packets passing an observation point during a certain time interval is called a "flow."

Substantially all network packets belonging to a flow may have a set of common properties. Each property can be a result of applying a function to one or more packet header fields (e.g., destination IP address), transport header fields (e.g., destination port number), or application header fields (e.g., real-time protocol (RTP) header fields; one or more characteristics of the packet (e.g., number of multiprotocol label switching (MPLS) labels); or one or more fields derived from packet treatment (e.g., next hop IP address, output interface). A packet may be characterized as belonging to a particular flow if it satisfies substantially all properties of that flow.

Exporter 14 may collect traffic statistics (e.g., information about network flows) from networks 12(1)-12(N), store the statistics in memory, for example, as one or more flow tables. In a general sense, the flow table occupies a consecutive area of physical memory in exporter 14 and comprises an array of flow entries. Each flow entry may include "key fields" that define the flow. Key fields may include, for example, fields that belong to the packet header (e.g., destination IP address) and indicate one or more properties of the packet (e.g., packet length), or properties derived from packet treatment (e.g., Autonomous System (AS) number). Each flow entry may also contain "non-key fields." Whereas key fields distinguish flows from each other, non-key fields are generic, and may include statistic fields, timestamp fields, and other fields.

Data from the flow entries may be aggregated and formatted into one or more flow record 26 before exporting to collector 16. Flow record 26 may include one or more template record 28 and/or one or more data record 30. Template record 28 includes one or more templates. A "template" is an ordered sequence of <type, length> pairs used to specify the structure and semantics of a particular set of flow information communicated from a NetFlow enabled device (e.g., exporter 14) to a collector (e.g., collector 16). For example, template record 28 may include one or more templates that indicate the format(s) for data record 30. As used herein, a "data record" includes data in a particular format (as specified by the template), with information about a specific flow that was observed at a particular observation point. Data record 26 may contain properties of the flow (e.g., the total number of bytes for all the flow's packets, source IP address, etc.). Each flow entry in the flow table may be encoded into respective data record 30 according to the appropriate template.

At a high level, exporter 14 may encode control information (e.g., information needed for endpoints to understand the NetFlow protocol) into template record 28, encode packets observed at observation points into data record 30, aggregate the template record 28 and data record 30 into flow record 26, packetize (e.g., divide into packets) flow record 26 and send flow record 26 to collector 16 in the form of export packets. Each flow record 26 sent from exporter 14 to collector 16 may contain data from key fields ("key bytes") and non-key fields ("non-key bytes"). Key bytes do not typically change for export packets referencing a specific flow. In addition, non-key bytes may be updated (e.g., changed) for each export packet.

An exporting process may send flow record 26 from exporter 14 to one or more collecting processes running in collector 16. The decision to export a flow entry as flow record 26 to collector 16 may be typically based on evaluating the flow entry against certain aging criteria that are either provided to exporter 14 by customers or obtained from default configurations of exporter 14. For example, most Cisco® products allow customers to configure a variety of timers for aging purposes. Such timers include, for example, inactive timer, active timer, and fast aging. For example, timers may specify exporting of flow entries every N seconds. In other examples, aging may be triggered by other events, such as when a transmission control protocol (TCP) connection is completed (e.g., detected through received packets that have reached an end of byte stream (FIN) or that have been reset with a RST flag), or the flow table is full. Once the flow entry is aged, resulting data record 30 is exported to collector 16. In some cases, the flow entry may be purged after exporting; in other cases, the flow entry may not be purged. For example, if the flow entry belongs to a long-lived flow and the flow table utilization is well below a recommended upper bound, exporter 14 may simply export the flow entry without purging it.

Embodiments of communication system 10 may reduce NetFlow traffic from exporter 14 using a temporal locality of flows. Temporal locality refers to a concept that a resource referenced at one point in time will be referenced again sometime in the near future. Thus, temporal locality can refer to the reuse of specific data and/or resources within relatively small time durations. Temporal locality of flows may be used, for example, by compressing key bytes without loss of any information. The compression may be achieved in one embodiment by building a level of indirection between key bytes and a local address of the flow entry at collector 16, and sending only a shorter local address instead of the longer key bytes for non-first-time data records.

Efficiency of the compression may depend on the degree of temporal locality (e.g., how soon the resource will be referenced next) and structure of data record 30 (e.g., structure may be different for IPv4 flows compared to IPv6 flows). For example, data record 30 may include a basic five tuple of information, comprising source IP address, destination IP address, source port, destination port, and protocol, as well as a two-byte entry index. Embodiments of communication system 10 may reduce the key field size of data record 30 for an IPv4 flow from 17 bytes to 2 bytes, and for an IPv6 flow from 41 bytes to 2 bytes. Additionally, methods implemented according to embodiments of communication system 10 can be incrementally deployed and optionally enabled without disrupting currently deployed NetFlow applications.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Deployment of sophisticated applications and state-of-the-art technologies such as input/output consolidation, virtualization, and cloud computing, etc., can cause increasing complexity of networking, which drives higher traffic volumes with more dynamic, diverse, and unpredictable traffic patterns. Network administrators may desire better visibility into traffic flows to enhance operational efficiency, reduce security risks, and optimize costs. Nowadays many technologies dealing with the network monitoring and analysis are available in the market to help network administrators better understand network behavior. In terms of management-plane traffic generation and flow granularity, NetFlow lies in between polling-based Simple Network Management Protocol (SNMP) and remote packet sniffing (WireShark, tcpdump, Switch Port Analyzer (SPAN), Encapsulated Remote SPAN (ERSPAN)). Since NetFlow is a true flow-based technology that conserves valuable forwarding bandwidth, it could become a de facto standard for analysis and reporting.

NetFlow traditionally enables several key customer applications including network monitoring, application monitoring and profiling, user monitoring and profiling, network planning, security analysis, accounting/billing, and NetFlow data warehousing and mining. NetFlow data can enable extensive near real time network monitoring capabilities. Flow-based analysis techniques may be utilized to visualize traffic patterns associated with individual routers and switches as well as on a network-wide basis (providing aggregate traffic or application-based views) to provide proactive problem detection, efficient troubleshooting, and rapid problem resolution. NetFlow data can enable network managers to gain a detailed, time-based, view of application usage over the network. NetFlow data can enable network engineers to gain detailed understanding of customer/user utilization of network and application resources, permitting them to efficiently plan and allocate access, backbone and application resources as well as to detect and resolve potential security and policy violations. NetFlow may help to minimize the total cost of network operations while maximizing network performance, capacity, and reliability.

In general, NetFlow can have two key components: (1) the flow table, which stores the flow information as flow entries and (2) the export mechanism, which sends NetFlow data to the collector. In general, each flow entry in the flow table can contain information for all active flows. The flow table is built by processing the first packet of a flow through a standard switching path. The flow table entries are exported to the collector in the form of flow records periodically based upon flow timers. The collector maintains a history of flow information. Currently available versions of NetFlow account for every packet (e.g., non-sampled mode) and provide a detailed view of all network traffic that entered a router or switch.

A NetFlow cache management software contains algorithms for efficiently determining if a packet is part of an existing flow or should generate a new flow entry. The algorithms are also capable of dynamically updating per-flow accounting measurements residing in the flow table, and cache aging/flow expiration determination. Rules for expiring flow entries include: flows which have been idle for a specified time are expired and removed from the cache; long lived flows are expired and removed from the cache (flows are not allowed to live more than 30 minutes by default, the underlying packet conversation remains undisturbed); as the flow table becomes full, a number of heuristics are applied to aggressively age groups of flows simultaneously; TCP connections which have reached the end of byte stream (FIN) or which have been reset (RST) may be expired. Expired flows are grouped together (e.g., up to 30 flow records) for export from the exporter.

The NetFlow Version 9 record format for creating flow records consists of a packet header followed by FlowSets. The IPFIX format is similar, with some variations. A FlowSet is a generic term for a collection of template records (e.g., template record 28) and data records (e.g., data record 30) that follow the packet header in an export packet. There are at least two different types of FlowSets: template FlowSets and data FlowSets. An export packet contains one or more FlowSets, and both template FlowSets and data FlowSets can be mixed within the same export packet. The FlowSet ID is used to distinguish template FlowSets from data FlowSets. For example, a template FlowSet may have a FlowSet ID in the range of 0-255. A data FlowSet may have a nonzero FlowSet ID greater than 255.

A template FlowSet is a collection of one or more template records (e.g., template record 28) and provides a description of fields that will be present in future data FlowSets. The template record, as discussed previously, is used to define the format of subsequent data records that may be received in current or future export packets. The template record within an export packet does not necessarily indicate the format of data records within that same packet. A collector application (e.g., at collector 16) may cache any template records received, and then parse the data records it encounters by locating the appropriate template record within the cache. A specific template record may be identified by its template ID, which distinguishes the specific template record from all other template records produced by a particular exporter. The collector application receiving export packets from several exporters may be aware that uniqueness is not guaranteed across exporters. Thus, the collector may also cache the address of the exporter (e.g., an exporter ID) that produced the template ID in order to enforce uniqueness.

The template FlowSet format typically includes a FlowSet ID (which is 0 for the template FlowSet), length of the FlowSet (which may be the sum of the lengths of the FlowSet ID, the length itself, and all template records within the FlowSet), Template ID (identifier for a template record, usually a number between 0 and 255), field count (number of fields in the template record that allow the collector to determine the end of the current template record and the start of the next), field type (a numeric value that represents the type of the field), and field length (the length of the corresponding field, in bytes). Exporters may generally support numerous field types, for example, as specified in RFC 3954. Most of the field values from 1 to 79 are predefined in RFC 3954 (and other applicable standards). Examples of field types include FLOWS (number of flows that are aggregated) with field value 3, IPV4_SRC_ADDR (IPv4 source address) with field value 8, IPV4_DST_ADDR (IPv4 destination address) with field value 12, L4_SRC_PORT (TCP/UDP source port number) with field value 7, L4_DST_PORT (TCP/UDP destination port number) with field value 11, LAST_SWITCHED (sysUptime in msec at which the last packet of the flow was switched) with field value 21, etc. Field values 25, 26, 43 to 45, 51 to 54, and 65 to 69 are reserved for proprietary field types. NetFlow standards provide for extensibility of the template, through definition of new field types that may be added to the list.

Data FlowSets may occur later than the template FlowSets within the same export packet or in subsequent export packets. The data FlowSet is a collection of one or more data records (e.g., data record 30) that have been grouped together in an export packet. The data record, as discussed previously, provides information about an IP flow that has been received at the exporter from various observation points. Each group of data records (that is, each data FlowSet) references a previously transmitted template ID, which can be used to parse the data contained within the data records. The layout of data in each data record maps to the field formats defined in the corresponding template record. Data records are not necessarily preceded by their corresponding template within an export packet.

Each data FlowSet format typically includes a FlowSet ID (which maps to a previously generated Template ID), length of the FlowSet (which may be the sum of the lengths of the FlowSet ID, the length itself, all the data records in the FlowSet, and any padding bytes), records containing field values (corresponding to the types and lengths specified in the corresponding template record having the template ID), padding bytes (added to ensure that the subsequent FlowSet starts at a 4-byte aligned boundary).

In some cases, the export packet may include interleaved template FlowSets and data FlowSets. In other cases, the export packet may consist entirely of data FlowSets. For example, after the appropriate template IDs have been defined and transmitted to the collector, most of the export packets may consist solely of data FlowSets. In yet other cases, the export packet may consist entirely of template FlowSets. Ordinarily, templates are "piggybacked" onto data FlowSets. However, in some instances, only templates are sent. For example, when a router first boots up or reboots, it attempts to synchronize with the collector as quickly as possible. The router may send template FlowSets at an accelerated rate so that the collector has sufficient information to interpret any subsequent data FlowSets. In addition, templates have a limited lifetime, and they may be periodically refreshed. Templates can be refreshed in two ways. The template can be resent every N number of export packets. The template can also be sent on a timer, so that it is refreshed every N number of minutes. If the refresh interval for a template occurs and there is no appropriate data FlowSet that can be sent to the collector, an export packet consisting solely of template FlowSets is sent.

The collector may receive template FlowSets from the exporter, normally before receiving data FlowSets. The data FlowSets can be decoded and stored locally on the collector. In case the template definitions have not been received at the time a data FlowSet is received, the collector may save the data FlowSet for later decode once the templates are received. The collector may not assume that the data FlowSet and the associated template IDs are exported in the same export packet.

A huge volume of data is typically exported from exporters to collectors. Although flow records generated by exporters in a NetFlow export are far shorter than a SPAN or ERSPAN of the original packets, the flow records could still result in a large amount of traffic that can potentially impact the availability and stability of networking. To reduce NetFlow traffic, sampling techniques (including both random flow sampling and time based flow sampling) have been used in the past. Even though sampling may not significantly affect some statistics or analysis, some other statistics or analysis can be severely distorted. For example, some of the information in the original flow records may be lost. As a result, with sampling enabled in NetFlow, accuracy could be compromised, and IP accounting may not be reliably implemented.

Communication system 10 is configured to address these issues (and others) in offering a system and method for reducing NetFlow traffic in a network environment. Embodiments of communication system 10 may include two different types of flow tables: an aging table and an exporting table. Exporter 14 may store flow entries obtained from networks 12(1)-12 (N) in the aging table. Entries in the aging table may be aged according to aging criteria. Aged entries may be copied to the exporting table, from where they may be encoded into data record 30 and exported to collector 16. Encoding may be implemented using at least two templates: (1) dictionary template $T_{dic}$; and (2) encoding template $T_{enc}$. Dictionary template $T_{dic}$ may be used to build a "dictionary" of key bytes. Encoding template $T_{enc}$ may be used to compress a subsequent data record 30 of the flow according to the dictionary.

In one embodiment, the content of the dictionary may include substantially all key bytes belonging to a particular flow that can be stored in a compact index (e.g., a 2-byte value) on exporter 14. In one embodiment, multiple dictionaries may be provided, each dictionary referencing a specific, distinct flow and suitably identified. In another embodiment, a single dictionary may include key bytes from multiple flows, with the key bytes of each flow distinguished from the key bytes of other flows by certain identifying parameters (e.g., the compact index).

Embodiments of communication system 10 may build the dictionary between exporter 14 and collector 16 by encoding a first data record 30(1) of a flow according to the dictionary template and sending first data record 30(1) to collector 16, compress a second data record 30(2) belonging to the same flow using the dictionary, and export data record 30(2) to collector 16. Collector 16 may be configured to decompress data record 30(2) using the dictionary.

Embodiments of communication system 10 may exploit temporal locality of data record 30 to compress it. Many research results in network measurement have shown that network traffic patterns are far from random. At a macro level, traffic flows with characteristics of self-similarity and long-range dependence in computer networks have been reported extensively. At a micro level, temporal locality and spatial locality in network traffic could be caused by human usage patterns, protocol dynamics, and application interactions, etc. In particular, temporal locality of flows indicates that key bytes in a particular flow entry may not change for consecutively exported flow entries. Embodiments of communication system 10 may reduce the size of data record 30 by compressing the key fields therein without loss of information.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. For example, exporter 14 and collector 16 may be part of entirely distinct networks. Moreover, communication system 10 can include any number of exporters, collectors, analyzers and storage within the broad scope of the present disclosure.

The example network environment, including networks 12(1)-12(N), may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Networks 12(1)-12(N) may represent any type of networks, including Internet, enterprise networks, cloud networks, etc.

In various embodiments, exporter 14 may be an application (e.g., computer program) running on a network element, such as a server, a line card of a router or switch, or other network element. In some embodiments, exporter 14 may be implemented on a physical line card; in other embodiments, exporter 14 may be implemented on a virtual line card. Similarly, collector 16 may be an application running on a network element, such as a server or other network element that includes software for executing its assigned tasks. In various embodiments, collector 16, storage 18, and analyzer 20 may be co-located on a single server; in other embodiments, collector 16, storage 18, and analyzer 20 may be located on disparate network elements interconnected over various communication links.

In various embodiments, encode module 22 and decode module 24 may be stand-alone applications running on the respective network elements housing exporter 16 and collector 18 (or analyzer 20). In other embodiments, encode module 22 may be an object module of the application implementing functionalities of exporter 14 and decode module 24 may be another object module of the application implementing functionalities of collector 16 and/or analyzer 20. In some embodiments, decode module 24 may be implemented on collector 16 alone; in some other embodiments, decode module 24 may be implemented on analyzer 20 alone; in yet other embodiments, decode module 24 may be implemented on both collector 16 and analyzer 20.

Figure 2:
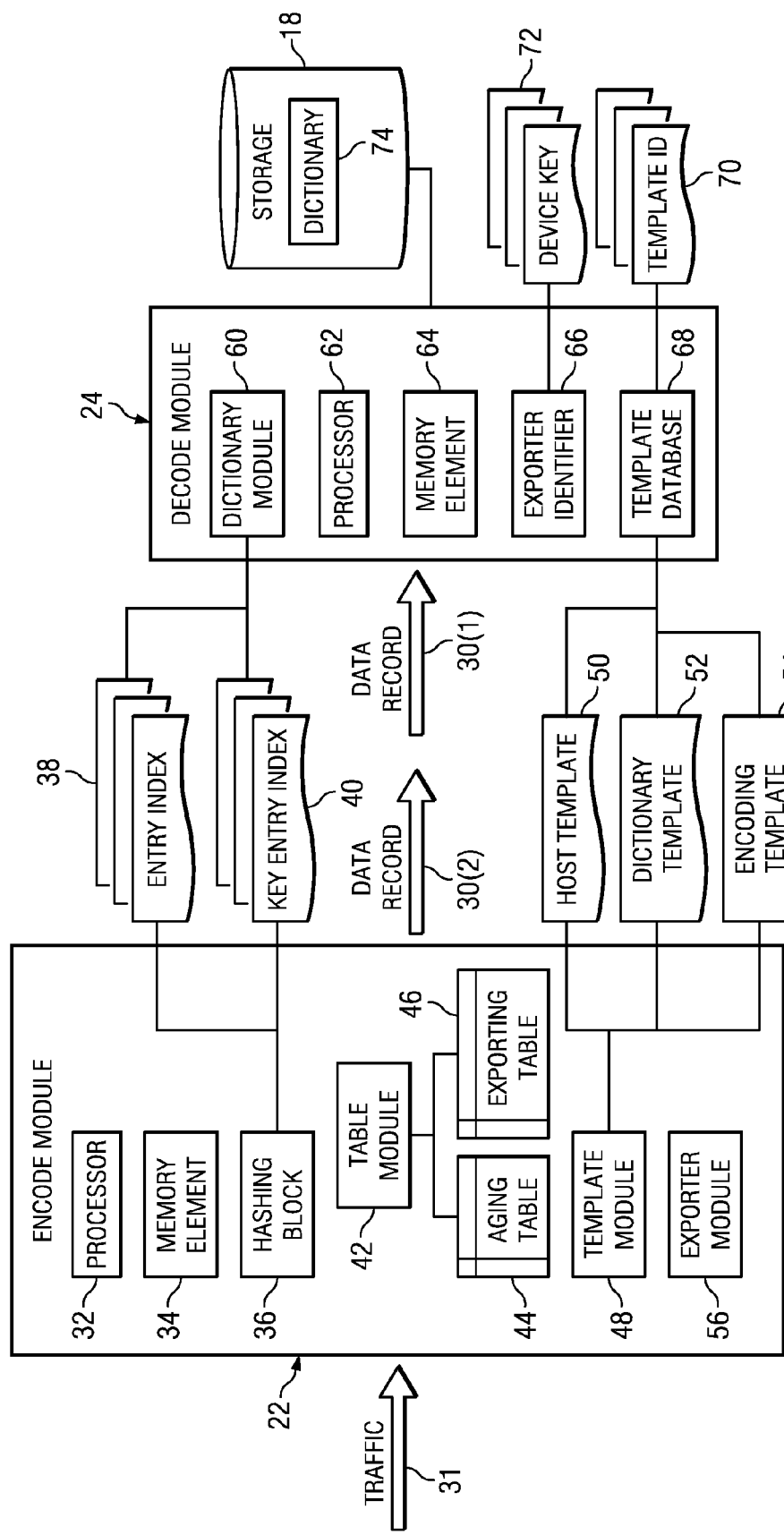
FIG. 2 is a simplified block diagram illustrating example details of the system in accordance with one embodiment.

Turning to FIG. 2, FIG. 2 is a simplified block diagram illustrating additional details of communication system 10. Encode module 22 may encode traffic 31 according to embodiments of the present disclosure. Encode module 22 may comprise a processor 32 and a memory element 34 for performing operations associated with embodiments of communication system 10. A hashing block 36 may create an ENTRY INDEX 38 and/or KEY ENTRY INDEX 40 for suitable flows in traffic 31 arriving from networks 12(1)-12(N). The value of KEY ENTRY INDEX 40 may be substantially the same as ENTRY INDEX 38. ENTRY INDEX 38 (and KEY ENTRY INDEX 40) can indicate a local array index that points to a flow entry in memory. Typically, flow entries pertaining to a particular flow may have the same ENTRY INDEX 38 (and corresponding KEY ENTRY INDEX 40).

A table module 42 may store arriving flow information as a flow entry in an aging table 44 and an exporting table 46. Each flow entry may be stored in a corresponding memory location of aging table 44 and can be located by ENTRY INDEX 38. Exporting may be decoupled from aging by placing incoming flow data into aging table 44, and outgoing (e.g., to be exported and exported) data into exporting table 46. In various embodiments, aging may be based on aging table 44 at a current time (e.g., time t), while exporting may be based on exporting table 46 that stores previously aged flow entries (e.g., at time t−1). Thus, flow entries in aging table 44 may be aged according to predetermined aging criteria; aged flow entries may be copied to exporting table 46, and exported from exporting table 46.

For example, each flow entry in aging table 44 may be checked against certain customer-defined or default aging criteria to determine if the flow entry is ready to be exported. If the flow entry in aging table 44 is to be aged out (for example, according to the aging criteria), exporting table 46 may be checked to determine if a peer entry (e.g., flow entry with same ENTRY INDEX value) exists. If such a valid peer entry in exporting table 46 exists, it may be exported immediately. If there is no such valid peer entry (e.g., flow entry is first flow entry for that particular flow, or flow entries in exporting table have been purged), the current flow entry in aging table 44 may be copied to exporting table 46. The flow entry in exporting table 46 may be exported after correlation of key bytes between two consecutive flow entries with the same ENTRY INDEX value, or an export timer (e.g., that forces unconditional exporting) expires.

Each flow entry in exporting table 46 may include three non-key fields (in addition to other key fields and non-key fields in currently deployed NetFlow applications): (1) KEY_MOD; (2) NON_KEY_MOD; and (3) REF_COUNT. KEY_MOD can be a Boolean flag indicating any change in key bytes between a flow entry in aging table 44 having an ENTRY INDEX value and a corresponding peer entry in exporting table 46 having the same ENTRY INDEX value. If the flow entry in aging table 44 is newly created, and it has the same key bytes as the peer entry in exporting table 46 with the same ENTRY INDEX value, KEY_MOD flag field for the flow entry in exporting table 46 is reset to 0; otherwise KEY_MOD flag for the flow entry in exporting table 46 may be set to 1.

NON_KEY_MOD can be a Boolean flag indicating any change in non-key bytes between a flow entry in aging table 44 having an ENTRY INDEX value and a corresponding peer entry in exporting table 46 having the same ENTRY INDEX value. If non-key bytes are the same in both entries, NON_KEY_MOD flag for the flow entry in exporting table 46 is reset to 0; otherwise, NON_KEY_MOD flag for the flow entry in exporting table 46 is set to 1. REF_COUNT can be an integer value representing the total number of exporting of flow entries in exporting table 46 having the same ENTRY INDEX value since a last reset of the KEY_MOD flag.

The exporting process may be triggered periodically to scan each flow entry in exporting table 46, for example, based on a predetermined timer. All valid entries with NON_KEY_MOD value of 1 may be exported, and the NON_KEY_MOD field may be thereafter reset to 0 after exporting. Depending on the value of the KEY_MOD field and REF_COUNT field, the current entry in exporting table 46 may be packaged into an export packet. When flow entries in exporting table 46 are ready to be exported, template module 48 may encode the flow entries provided by table module 36 according to one of at least three templates: a host template 50, a dictionary template 52, and an encoding template 54.

In various embodiments, host template 50 includes substantially all fields predefined in NetFlow standards. Dictionary template 52 includes substantially all fields in host template 50; additionally, ENTRY INDEX 38 may be added as a new field (e.g., with field value 80). In addition, encoding template 54 may exclude selected key fields in host template T, and replace them with KEY ENTRY INDEX 40, which may be added as a new field (e.g., with field value 81). The new field types can be added as either standard type or vendor proprietary type, depending on whether the new types are published as part of the standard.

During operation, data record 30(1) belonging to a particular flow may be encoded according to dictionary template 52, and exported to collector 16. A subsequent data record 30(2) belonging to the same flow (e.g., as identified by the ENTRY INDEX value in corresponding flow entry in exporting table 46) may be encoded according to encoding template 54. Exporter module 56 may facilitate packetizing and exporting data records 30(1) and 30(2) to collector 16. Because key fields in data record 30(2) are replaced by KEY ENTRY INDEX 40 (which value may be substantially identical to ENTRY INDEX value), data record 30(2) may be substantially smaller in size (e.g., compressed) than data record 30(1). Thus, total NetFlow traffic volume may be reduced by taking advantage of computation and memory resources in local NetFlow devices (e.g., exporter 14), exploiting engineering tradeoffs between shared networking resource and private computation/memory resources. For example, the encoding and decoding of compressed data records may increase the workload for NetFlow functionality in end devices (e.g., exporter 14, collector 16).

Collector 16 and analyzer 20 may not be sensitive to the arrival time of data records 30(1) and 30(2) from exporter 14, as long as data records 30(1) and 30(2) during a particular interval are complete (e.g., all export packets embodying data records 30(1) and 30(2) have been received) before parsing and analysis. Decode module 24 in collector 16 (and/or analyzer 20) may include a dictionary module 60, a processor 62, a memory element 64, exporter identifier 66, and a template database 68. In various embodiments, decode module 24 may communicate with storage 18 to store data record 30 (including 30(1), and 30(2)) as needed. Template records, including host template 50, dictionary template 52, and encoding template 54 may be stored and/or accessed by template database 68. Each template record may be identified by its corresponding template ID 70. In an example embodiment, template ID 70(1) of dictionary template 52 can be an even number, and template ID 70(2) of associated encoding template 54 can be an odd number that immediately follows template ID 70(1) of relevant dictionary template 52. Both template IDs 70(1) and 70(2) may be reserved in a special integer range known to both exporter 14 and collector 16. Given one of the two template IDs 70(1) and 70(2), collector 16 can easily determine the other corresponding template ID 70(1) and 70(2).

During operation, decode module 24 may receive data record 30(1) encoded according to dictionary template 52. Data record 30(1) may include template ID 70, a device key 72, indicating an identity of exporter 14, and ENTRY INDEX 38. Exporter identifier 66 may extract device key 70 from a packet header of data record 30(1), and dictionary module 60 may update (or create) a dictionary 74 using a composite key comprising template ID 70, device key 72, and ENTRY INDEX 38. Dictionary 74 may be stored in storage 18. Data record 30(2) encoded according to encoding template 54 may be received (e.g., subsequently) by decode module 24. Exporter identifier 66 may extract template ID 70, device key 72 and KEY ENTRY INDEX 40 from data record 30(2). Dictionary module 60 may look up dictionary 74 using another composite key comprising template ID 70, device key 72 and KEY ENTRY INDEX 40, and substitute KEY ENTRY INDEX 40 in compressed data record 30(2) with key bytes from dictionary 74 corresponding to the key fields that were replaced to compress data record 30(2).

Sometimes, data FlowSets and/or template FlowSets may be lost during transportation from exporter 14 to collector 16 for a variety of reasons. In case of a reliable transport protocol like Stream Control Transmission Protocol (SCTP), error recovery may be part of the protocol itself. In case a non congestion-aware transport protocol is used, for example, UDP, packet errors may impact efficiency and accuracy of compression. Nevertheless, loss of either data FlowSets or template FlowSets may occur, and should be acceptable according to NetFlow standards (e.g., NetFlow Version 9). In many embodiments, exporter statistics, reported as Optional template FlowSets from exporter 14 to collector 16, may enable collector 16 to detect the quantity of packet losses. However, collector 16 may not attempt to recover the lost packets. Collector 16 may merely report the possibility of packet loss as part of traffic analysis. Evaluating accuracy of data records may be left to the discretion of the customer.

In case of loss of template FlowSets, current standards (e.g., NetFlow version 9) have a limited built-in mechanism to recover the loss. For example, template records (including records of host template 50, dictionary template 52 and encoding template 54) and optional template records may be periodically transmitted to refresh data at collector 16. Data record 30 may be stored in storage 18 without appropriate templates information, to be decoded after relevant information is received. In various embodiments, collector 16 may store data records (e.g., 30(1) and 30(2)) in storage 18 for analysis at a later time by analyzer 20.

Various embodiments of communication system 10 may implement a periodic refreshing mechanism for dictionary-relevant data FlowSets to alleviate impairment of missing dictionary entries from packet loss. In some embodiments, for consecutive record exporting with the same ENTRY INDEX value, exporter 16 may use dictionary template 52 for every MAX_T_ENC_RECORD number of data records. Such a mechanism can reduce the efficiency of key byte compression, but it may achieve better reliability. MAX_T_ENC_RECORD can be configured to any desired value by customers based on their networking scenarios. In other embodiments, packet losses as a whole may be reduced by deployment of reliable transport protocol such as SCTP.

Figure 3:
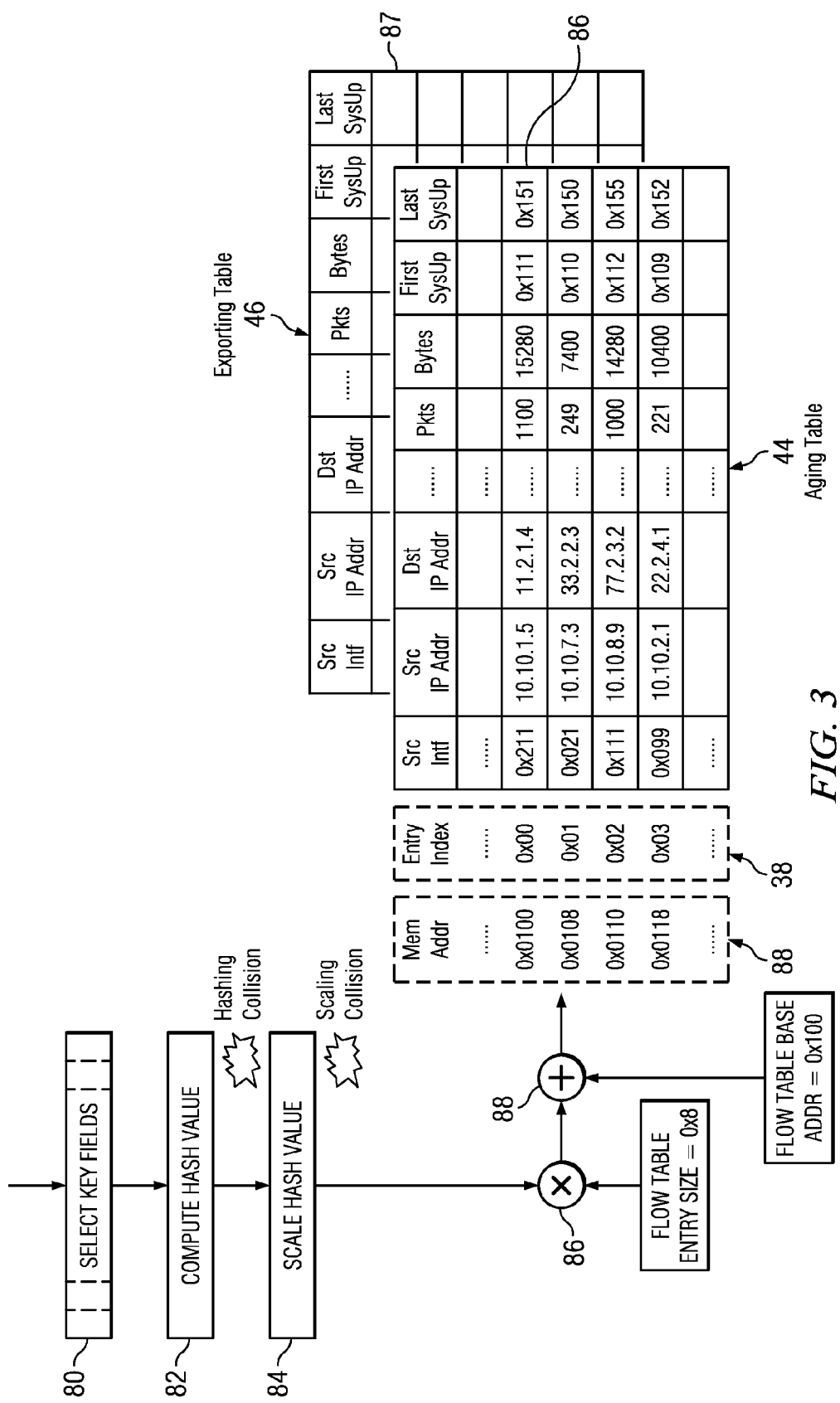
FIG. 3 is a simplified block diagram illustrating other example details of the system in accordance with another embodiment.

Turning to FIG. 3, FIG. 3 is a simplified diagram illustrating example operational activities for generating ENTRY INDEX 38 and populating example aging table 44 and exporting table 46 associated with embodiments of communication system 10. At 80, key fields in incoming traffic from networks 12(1)-12(N) may be selected or identified for compression. At 82, a hash value may be computed. For example, a selected set of key fields may be fed into hashing block 36 that uses a hashing function. In a typical implementation, the hashing function may be an algorithm based on prime polynomials. During calculation of the hash value, a hashing collision may occur, for example, when two distinct sets of key fields have the same hash value. Such collided flows may be ignored in some embodiments of communication system 10.

At 84, the hash value can be scaled to generate ENTRY INDEX 38 indicating a physical address that may be used to access the corresponding flow entry in aging table 44. At index scaling, a scaling collision may occur. Depending on system implementation, a collided flow may be ignored, and may not have corresponding ENTRY INDEX 38. A flow entry 86 (e.g., of size 0x8) may be stored at a memory address 88 (e.g., 0x100). Merely for illustrative purposes, and not as limitations, four example flow entries are illustrated in FIG. 3. For example, at memory address 88 (e.g., 0x0100), flow entry 86 in aging table 44 may be identified by corresponding ENTRY INDEX 38 (e.g., 0x00). For example, flow entry 86 with ENTRY INDEX value 0x00 may correspond to a flow with source interface 0x211, source IP address 10.10.1.5, destination IP address 11.2.1.4, 1100 packets, 15280 bytes, with first system up time at 0x111 and last system up time at 0x151. When flow entry 86 in aging table 44 is ready to be exported (e.g., aged according to certain aging criteria), the aged entry, including ENTRY INDEX value, may be copied to flow entry 87 exporting table 46.

Figure 4:
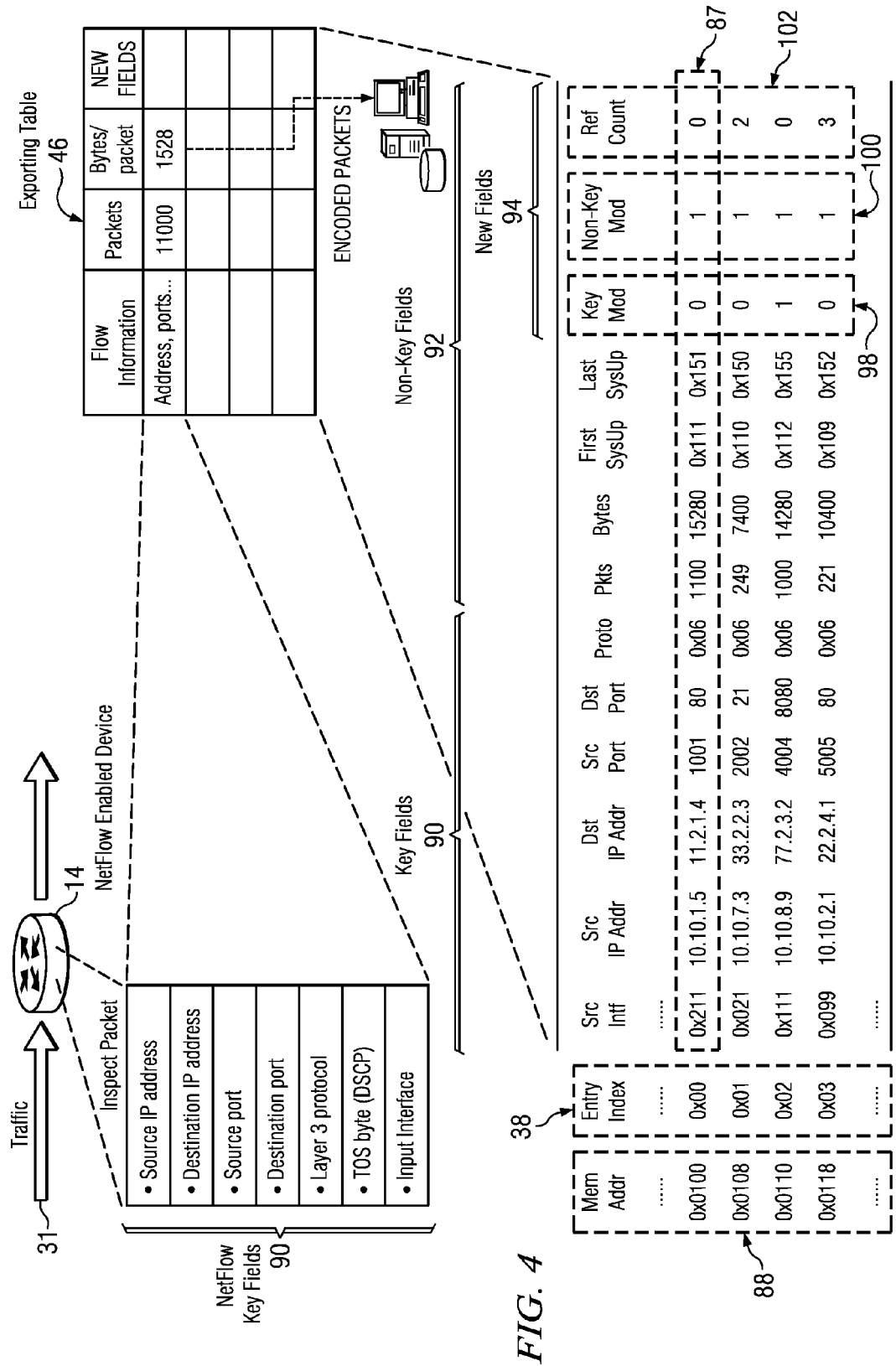
FIG. 4 is a simplified block diagram illustrating yet other example details of the system in accordance with yet another embodiment of the system.

Turning to FIG. 4, FIG. 4 is a simplified block diagram to illustrate example details of embodiments of communication system 10. Traffic 31 may flow through a NetFlow enabled device (e.g., exporter 14). Exporter 14 may inspect traffic 31 and retrieve key fields 90 (e.g., NetFlow Key Fields). Key fields 90 may include, for example, source IP address, destination IP address, source port, destination port, etc. Examples of key fields 90 shown in the FIGURE are merely for illustrative purposes. In various embodiments, key fields 90 may include the same, similar, or different properties. Key fields 90 may be included in each entry in exporting table 46 (and aging table 44, which is not shown). Encoded packets derived from flow entries in exporting table 46 may be sent to collector 16 as appropriate.

Some example flow entries in exporting table 46 are shown in greater detail in the FIGURE. For example, flow entry 87 may correspond to ENTRY INDEX value of 0x00. Each flow entry may include key fields 90 and non-key fields 92. In particular, new non-key fields 94 may include KEY_MOD 98, NON_KEY_MOD 100, and REF_COUNT 102. For example, KEY_MOD 98, NON_KEY_MOD 100, and REF_COUNT 102 of flow entry 87 may be 0, 1, and 0, respectively. KEY_MOD 98 of value 0 can indicate that the corresponding peer flow entry 86 (e.g., having the same ENTRY INDEX value) in aging table 44 is newly created and it has the same keys as flow entry 87 in exporting table 46. NON_KEY_MOD 100 of value 1 may indicate that flow entry 87 is ready to be exported. REF_COUNT 102 of value 0 may indicate that 0 entries have been exported since the last reset of the bit corresponding to KEY_MOD 98.

Figure 5:
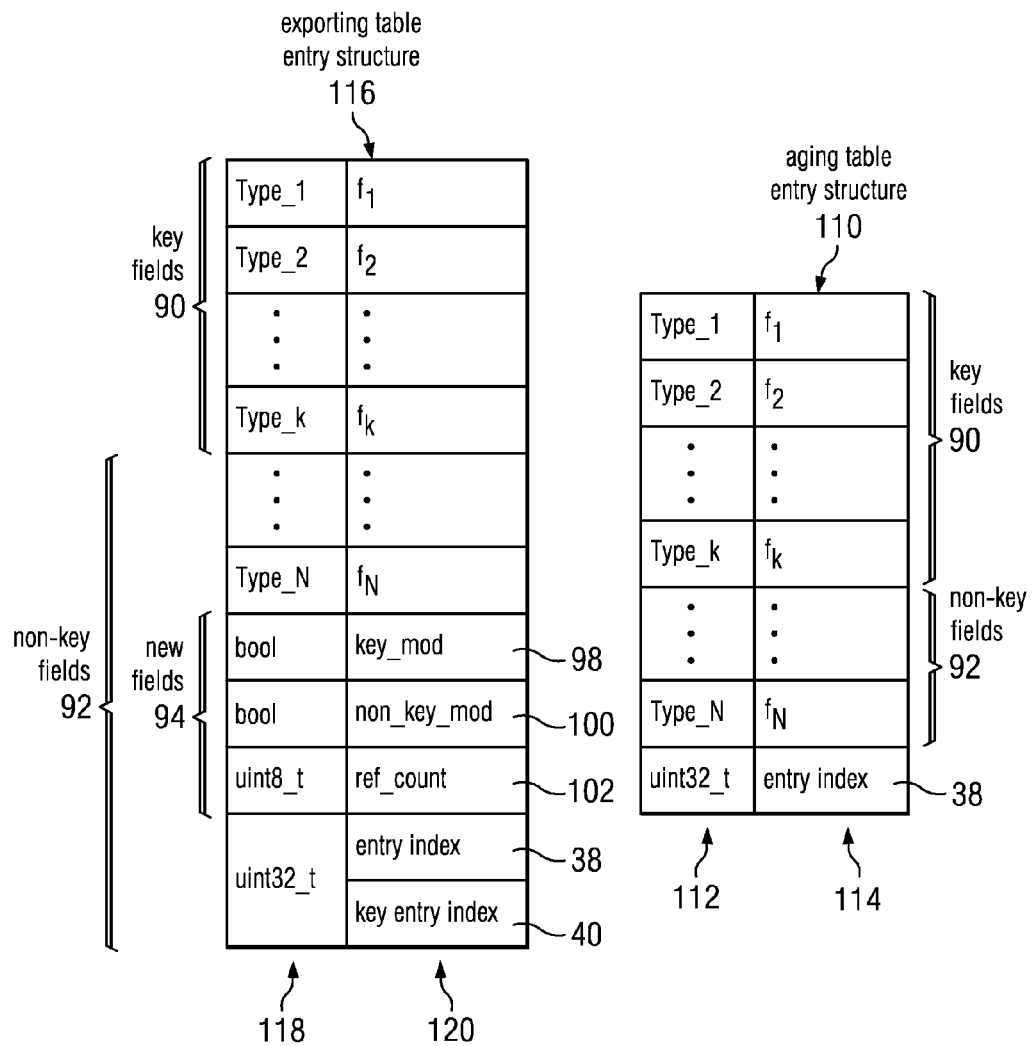
FIG. 5 is a simplified diagram illustrating yet other example details that may be associated with an embodiment of the system.

Turning to FIG. 5, FIG. 5 is a simplified diagram shown an example exporting table entry structure and an example aging table entry structure. Example aging table entry structure 110 represents a single flow entry 86 in aging table 44. Aging table entry structure 110 can include a type field 112 and a value field 114. There may be a total of N fields in each flow entry 86, including k key fields 90 and remaining non-key fields 92. Each flow entry 86 may also include ENTRY INDEX 38 for example, as a 32-bit integer type. Example exporting table entry structure 116 represents a single flow entry 87 in exporting table 46. Exporting table entry structure 116 can include a type field 118 and a corresponding value field 120. In addition to N fields in each flow entry 87, including k key-fields 90, and non-key fields 92, each flow entry 87 may also include new fields 94, including KEY_MOD 98, NON_KEY_ MOD 100, REF_COUNT 102, and one of ENTRY INDEX 38 or KEY ENTRY INDEX 40.

In various embodiments, for each exporting table 46, the following state variables might also help with aging, exporting, and compression (depending on implementation): TBL_SIZE (e.g., total number of flow entries for a given exporting table); NUM_ENTRY (e.g., total number of valid flow entries in a given exporting table); NUM_KEY_MOD (e.g., total number of valid flow entries with KEY_MOD flag bit being set to 1). Such state variables can be maintained for each exporting table 46 in a suitable memory location or databases.

According to an embodiment of communication system 10, at exporter 14, each aging table 44 or exporting table 46 may be logically like an array of flow entry structure in C programming language. If the flow table has template T=<$f_1$, $f_2, \ldots f_K, f_{K+1}, \ldots f_N$>, let the structure type of flow entry 86 in aging table 44 be "nf_age_entry_t", which can be defined according to the following Table 1:

TABLE 1

| typedef struct nf_age_entry_s { |  |
| --- | --- |
| type_1 | f1; |
| type_2 | f2; |
| ...; |  |
| type_k | fK; |
| ...; |  |
| type_N | fN; |
| uint32_t | ENTRY INDEX; |
| } nf_age_entry_t; |  |

Let the structure type of flow entry 87 in exporting table 46 be "nf_exp_entry_t", which can be defined according to the following Table 2:

TABLE 2

```
typedef struct nf_exp_entry_s {
    type_1      f1;
    type_2      f2;
    ...;
    type_k      fK;
    ...;
    type_N      fN;
    bool        KEY_MOD;
    bool        NON_KEY_MOD;
    uint8_t     REF_COUNT;
    uint32_t    ENTRY INDEX;
} nf_exp_entry_t;
```

Figure 6:
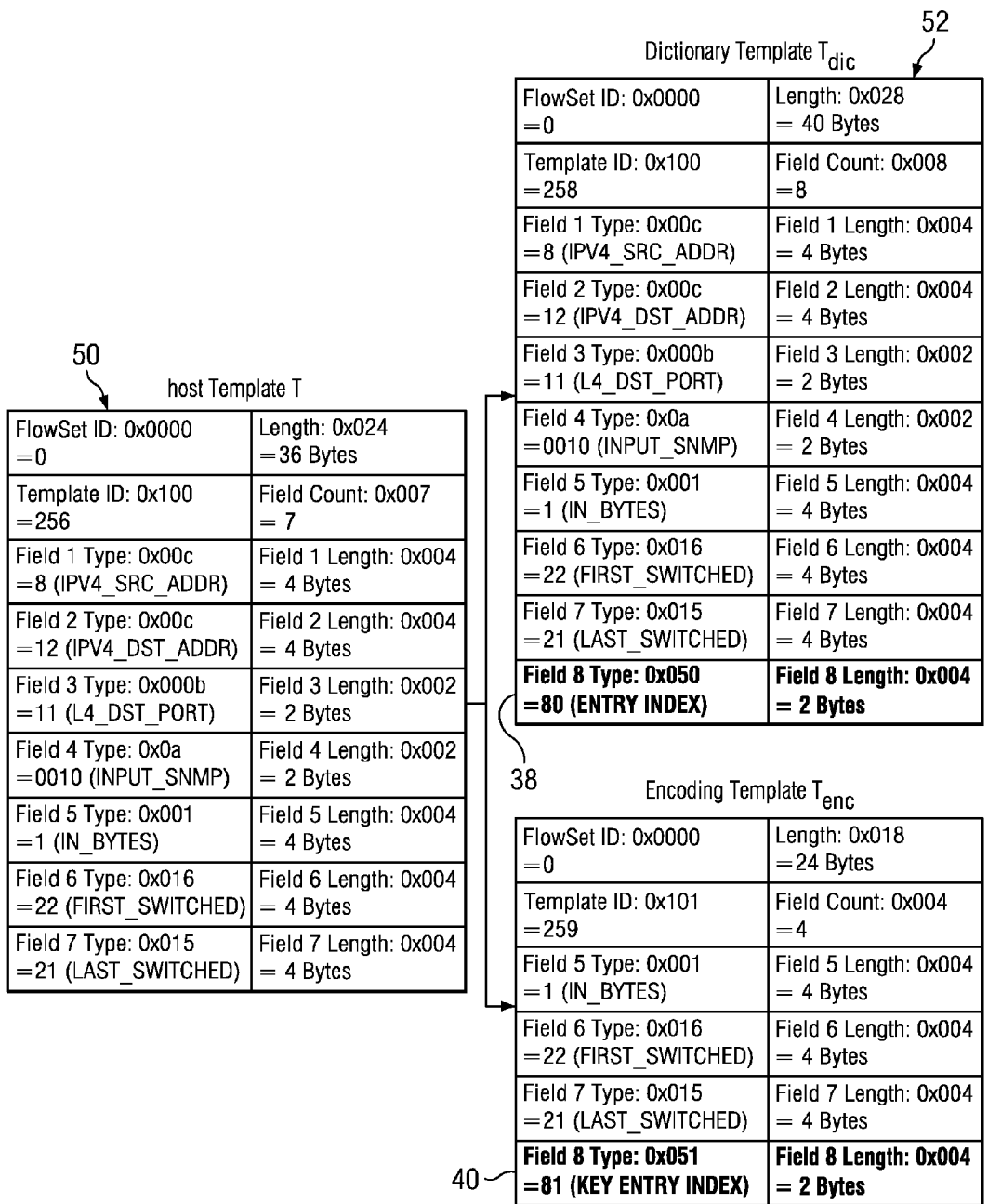
FIG. 6 is a simplified diagram illustrating yet other example details that may be associated with another embodiment of the system.

Turning to FIG. 6, FIG. 6 is a simplified diagram showing example templates according to embodiments of communication system 10. Each template (e.g., host template 50, dictionary template 52, and encoding template 54) may include a field type and corresponding length. In general, each flow entry may be encoded according to a regular N-field host template 50; i.e., $T = <f_1, f_2, \ldots f_K, f_{K+1}, \ldots f_N>$, where each $f_i$ represents a field, such as source IP address, destination IP address, etc. Each flow entry may contain K key fields 90 (e.g., $<f_1, f_2, \ldots f_K>$), which may be used to define a particular flow and distinguish one flow from another, and non-key fields 92 for a total of N fields (e.g., $<f_{K+1}, f_{K+2}, \ldots f_N>$). For example, example host template 50 may include nine (9) total fields, including four key fields 90 (e.g., Field 1, field 2, field 3 and field 4) and five non-key fields 92 (e.g., FlowSet ID, template ID, field 5, field 6 and field 7).

Dictionary template 52 may be obtained by including all fields in template 50 and an additional field, namely ENTRY INDEX 38 as follows: $T_{dic} = <f_1, f_2, \ldots f_K, f_{K+1}, \ldots f_N, \text{entry\_index}>$. For example, example dictionary template 52 may include ten (10) total fields, including four key fields 90 (e.g., Field 1, field 2, field 3 and field 4), five non-key fields 92 (e.g., FlowSet ID, template ID, field 5, field 6 and field 7) and ENTRY INDEX 38 (e.g., in field 8). Encoding template 54 may be obtained by replacing selected key fields 90 with KEY ENTRY INDEX 40 as follows: $T_{enc} = <\text{key\_entry\_index}, f_{K+2}, \ldots f_N>$. For example, encoding template 54 may replace field 1, field 2, field 3 and field 4 with KEY ENTRY INDEX 40 for a total of six (6) fields, including five non-key fields 92 (e.g., FlowSet ID, template ID, field 5, field 6 and field 7) and KEY ENTRY INDEX 40.

In various embodiments, a first data record 30(1) encoded according to dictionary template 52 may be sent to collector 16. Collector 16 may decode data record 30(1) and store key fields 90 in dictionary 74 in storage 18. A second data record 30(2) for the same flow (e.g., identified by ENTRY INDEX value) may be encoded according to encoding template 54. When collector 16 receives the encoded packets, collector 16 may insert missing key fields 90 by replacing KEY ENTRY INDEX 40 of the encoded packets with corresponding key fields 90 from dictionary 74.

Since NetFlow version 9 has implicit key field types such as ingress/egress ifindex, data record 30(2) encoded with encoding template 54 for a particular flow entry may have smaller size than those with host template 50 for the same flow entry. Therefore, it may be straightforward to justify the introduction of encoding template 54 for the purpose of key bytes compression in one embodiment. In another embodiment, a possible alternate way to publish dictionary 74 to collector 16 may include sending each dictionary entry (e.g., data record 30(1)) in an options data record (for example, similar to interface table, exporter statistics, and sample table in NetFlow version 9). A new option template may be created to encode the dictionary entries. In other embodiments, introduction of dictionary template 52 may allow a free ride of dictionary publishing with regular data record 30 at minimum cost such as the one additional field, ENTRY INDEX 38.

Let n be an integer that represents a sequence number of exported data record 30(n) having ENTRY INDEX 38 (say of value "i") in exporting table 46. Thus, $<v_{1[i,n]}, v_{2[i,n]}, \ldots, v_{K[i,n]}>$ comprises K key fields 90 of exported data record 30(n) of the flow represented by ENTRY INDEX 38 having value i, where $v_{m[i,n]}$ is the value of key field $f_m$. To implement a reduction of total data record size, data record 30(n) may be exported based on encoding template 54 if a previous data record 30(n−1) for the same flow was encoded according to dictionary template 52 and sent to collector 16. Therefore, encode module 22 may store information about the flow sufficient to indicate that the dictionary template 52 has been sent to collector 16.

Reduction in data record size may be guaranteed if encode module 22 knows that $<v_{1[i,n+1]}, v_{2[i,n+1]}, \ldots, v_{K[i,n+1]}>$ is the same as $<v_{1[i,n]}, v_{2[i,n]}, v_{K[i,n]}>$, which could mean that a flow entry is aged and exported but without being deleted. However, the temporal relationship among aging, exporting, and deletion of a flow entry may depend on a vendor's specific implementation of NetFlow protocols. In some embodiments, at time n, if a flow entry is aged and deleted, future tuple $<v_{1[i,n+1]}, v_{2[i,n+1]}, \ldots, v_{K[i,n+1]}>$ at n+1 may be unknown and uncertain. With separation of aging and exporting, for example, using exporting table 46 and aging table 44, both $<v_{1[i,n]}, v_{2[i,n]}, \ldots, v_{K[i,n]}>$ and its history $<v_{1[i,n-1]}, v_{2[i,n-1]}, \ldots, v_{K[i,n-1]}>$ (if there is any) may be available for a compression decision regarding data record 30. With decoupling, aging may be based on aging table 44 at point n (e.g., aging criteria applied to entries in aging table 44), whereas exporting may be based on exporting table 46 that can store flow entries at point n−1 (e.g., entries that were previously aged).

Figure 7:
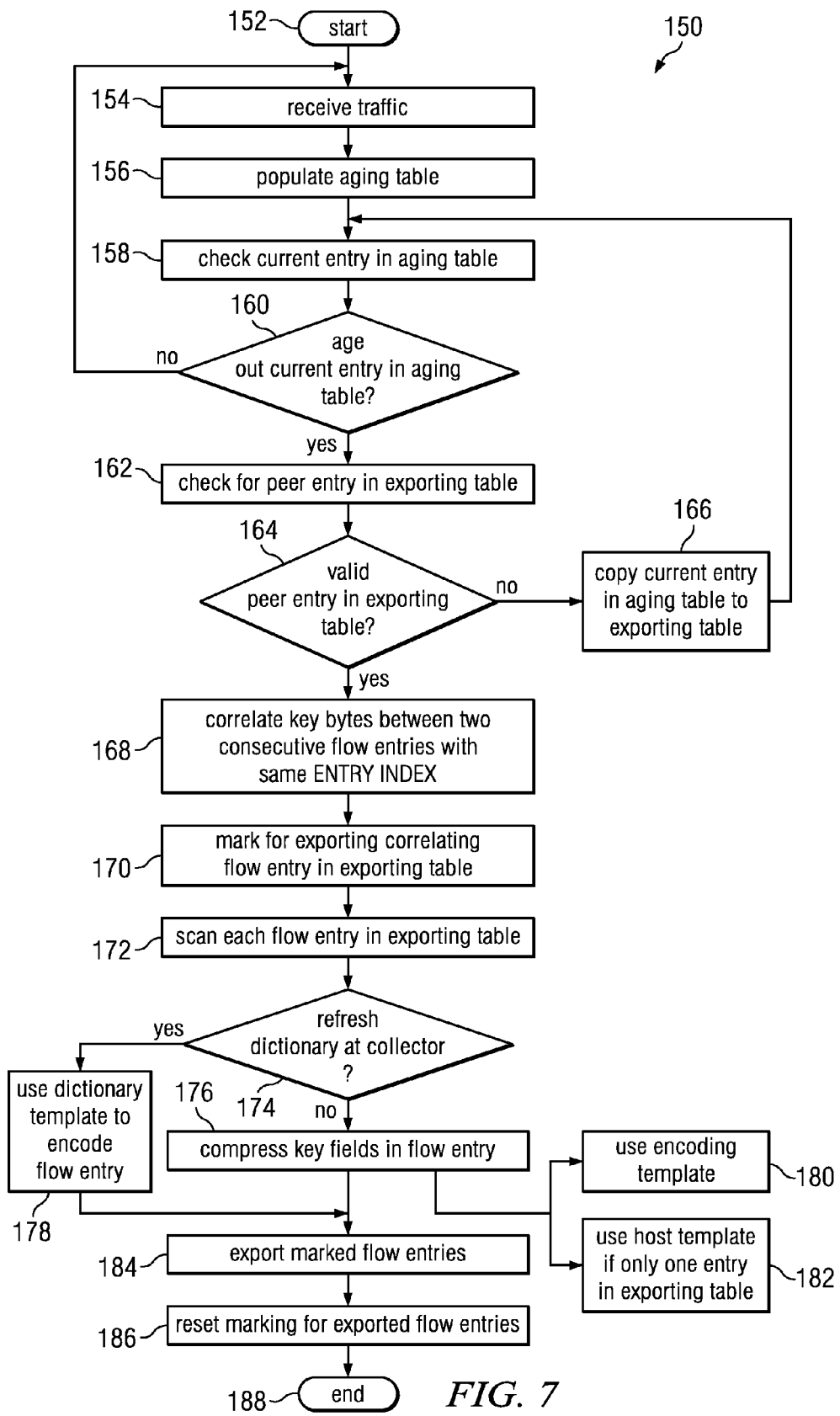
FIG. 7 is a simplified flow diagram illustrating example operations that may be associated with another embodiment of the system.

Turning to FIG. 7, FIG. 7 is a simplified flow diagram illustrating example operational steps to compress data records according to embodiments of communication system 10. Operations 150 may start at 152 when communication system 10 is activated. At 154, exporter 14 may receive traffic 31. At 156, exporter 14 may populate aging table 44 with flow entries including ENTRY INDEX values calculated from appropriate hashing functions. At 158, flow entry 86 in aging table 44 may be checked for aging. For ease of explanation of this FIGURE, the flow entry under analysis in aging table 44 is called "current entry." A decision may be made at 160 to age out the current entry. If the current entry is not to be aged out, the operations loop back to 154. Otherwise, if the current entry is to be aged out, exporting table 46 may be checked at 162 to determine if a peer entry (e.g., flow entry 87) having the same ENTRY INDEX value exists. A determination may be made at 164 whether a valid peer entry exists in exporting table 46.

If a valid peer entry does not exist (indicating that flow entries corresponding to the flow have already been exported and purged, or that the flow entry is a new flow), the current entry may be copied to exporting table 46 at 166. The operations may loop back to 158. In addition, if a valid peer entry exists in exporting table 46 (indicating that the flow entry was aged, but not exported), key bytes (e.g., for key fields 90) between two consecutive flow entries with the same ENTRY INDEX 38 may be correlated at 168. For example, the entries may be correlated if the peer entry in exporting table 46 has the same key bytes as the current entry in aging table 44 (indicating that they belong to the same flow). At 170, the correlating entry in exporting table 46 may be marked for exporting (e.g., by setting NON_KEY_MOD 100 of the correlating entry to 1).

At 172, each flow entry 87 in exporting table 46 may be scanned. At 174, a determination may be made whether to refresh dictionary 74 at collector 16. In some embodiments, the determination may be informed by the value of REF_COUNT 102. For example, if the REF_COUNT value of the flow entry numbered MAX_T_ENC_RECORD is 0, the flow entry may be encoded according to dictionary template 52 at 178. Otherwise, key fields 90 in the flow entry may be compressed. In some embodiments, key fields 90 may be compressed according to encoding template 54 at 180. If there is only one flow entry in exporting table 46, it may be sent uncompressed, for example, by encoding according to host template 50 at 182. At 184, the marked flow entries may be exported. At 186, the marking for exported flow entries may be reset, to indicate their exported status. The operations may end at 188.

Figure 8:
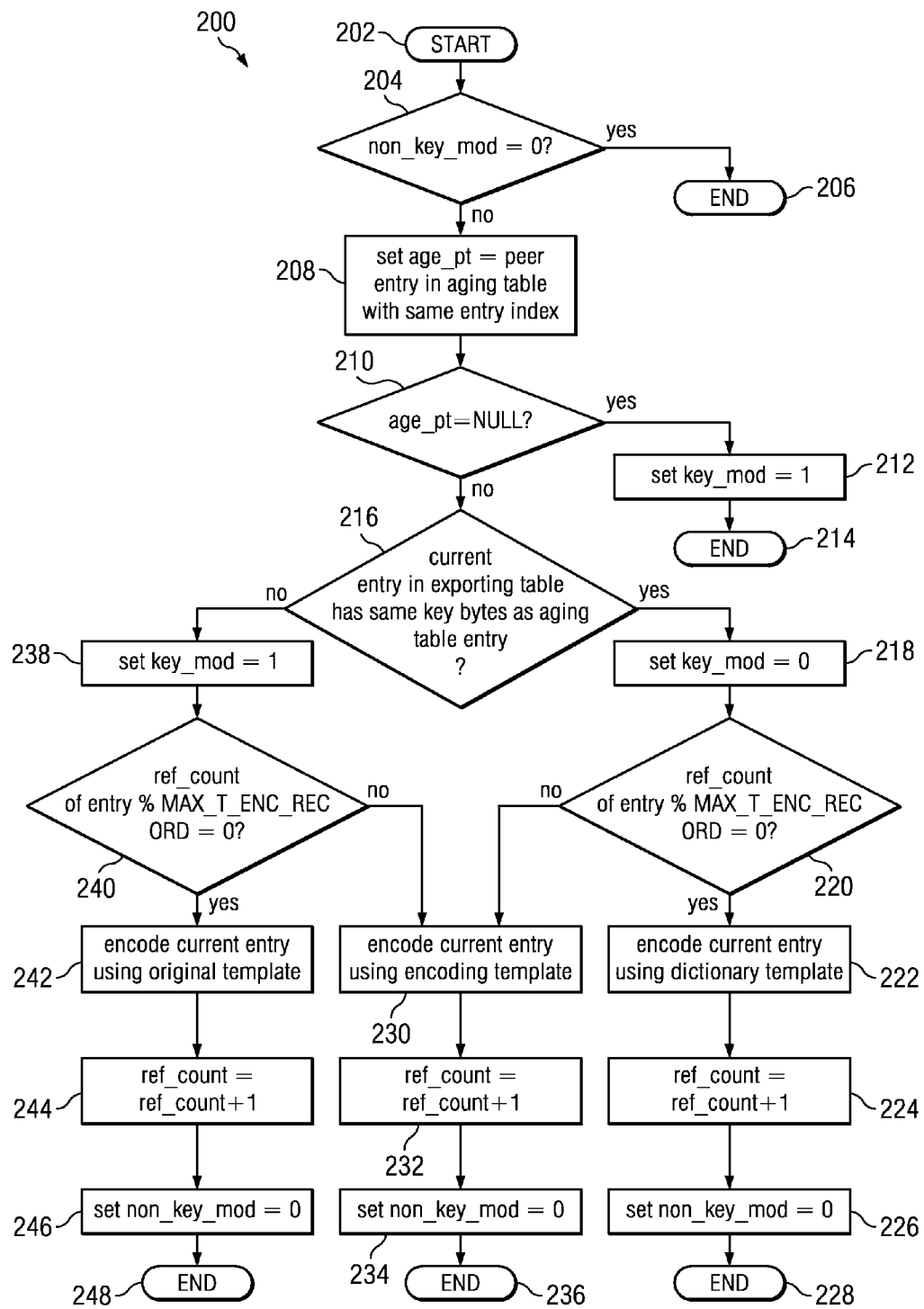
FIG. 8 is a simplified flow diagram illustrating details of other example operations that may be associated with another embodiment of the system.

Turning to FIG. 8, FIG. 8 is a simplified flow diagram illustrating example details of operational steps to export data record 30. Operations 200 may start at 202 on flow entry 87 in exporting table 46. For ease of explanation, the flow entry under analysis in exporting table 46 is referred to as the "current entry." At 204, a determination may be made if NON_KEY_MOD 100 of the current entry is set to 0. If set to 0, the current entry may not be exported, and the operations may end at 206. Otherwise, if NON_KEY_MOD 100 is not 0, pointer AGE_PT may be set to point to a peer entry in aging table 44 having the same ENTRY INDEX 38 as the current entry at 208. If AGE_PT is null (indicating that there is no peer entry) at 210, a pessimistic decision may be arrived at assuming that a future flow entry may have different key bytes than the current entry. Thus, KEY_MOD 98 of the current entry may be set to 1 at 212, and operations may end at 214.

If AGE_PT is not null at 210, a determination may be made at 216 whether the current entry has the same key bytes as the peer entry in aging table 44. If yes, then KEY_MOD 98 of the current entry may be set to 0 at 218. If the current entry is numbered MAX_T_ENC_RECORD, REF_COUNT 102 of the current entry may be checked to determine if it is 0 at 220. If REF_COUNT 102 is zero, indicating that dictionary 74 at collector 16 may be refreshed, the current entry may be encoded according to dictionary template 52 at 222. REF_COUNT value may be advanced by 1 at 224, and NON_KEY_MOD 100 may be reset to 0 at 226. The operations may end at 228. If REF_COUNT 102 is not 0 at 220 (or the current entry is not numbered MAX_T_ENC_RECORD), the current entry may be encoded using encoding template 54 at 230. REF_COUNT value may be advanced by 1 at 232, and NON_KEY_MOD 100 may be reset to 0 at 234. The operations may end at 236.

Going back to decision step 216, if the current entry does not have the same key bytes as the peer entry in aging table 44, KEY_MOD 98 of the current entry may be set to 1 at 238. If the current entry is numbered MAX_T_ENC_RECORD, REF_COUNT 102 of the current entry may be checked to determine if it is 0 at 240. If REF_COUNT 102 is not zero, the current entry may be encoded using encoding template 54 at 230. REF_COUNT value may be advanced by 1 at 232, and NON_KEY_MOD 100 may be reset to 0 at 234. The operations may end at 236. Otherwise, if REF_COUNT is 0, indicating that the current entry is the only entry in exporting table 46, the current entry may be encoded according to host template 50. REF_COUNT value may be advanced by 1 at 244, and NON_KEY_MOD 100 may be reset to 0 at 246. The operations may end at 248.

Figure 9:
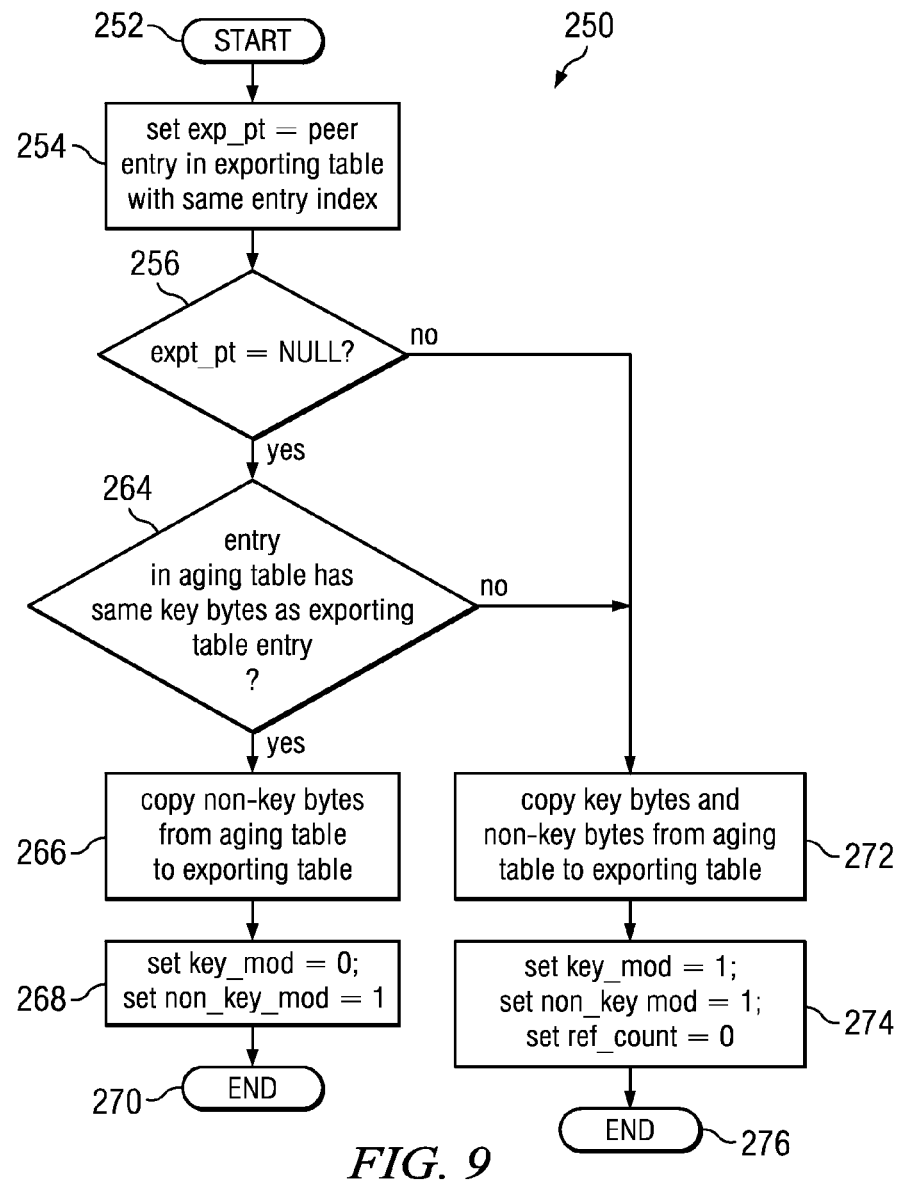
FIG. 9 is a simplified flow diagram illustrating yet other details of example operations that may be associated with another embodiment of the system.

Turning to FIG. 9, FIG. 9 is a simplified flow diagram illustrating example details of operational steps to age an entry in aging table 44 and mark it for exporting. Operations 250 may start at 252 on flow entry 86 in aging table 44. For ease of explanation, the flow entry under analysis in aging table 44 is referred to as the "current entry." At 254, pointer EXP_PT may be set to point to a peer entry in exporting table 46 with the same ENTRY INDEX value as the current entry. At 256, if EXP_PT is null (indicating that the peer entry does not exist) a determination may be made at 264 whether the current entry has the same key bytes as the peer entry in exporting table 46. If the current entry has the same key bytes as the peer entry in exporting table 46, non-key bytes from aging table 44 may be copied to exporting table 46 at 266 (as there is no need to copy identical key bytes), KEY_MOD 98 may be set to 0, and NON_KEY_MOD 100 may be set to 1 at 268, and the operations may end at 270.

If EXP_PT is not null at 256 (indicating that the peer entry does not exist), the current entry, including key bytes and non-key bytes, may be copied to exporting table 46 at 272. KEY_MOD 98 may be set to 1, and NON_KEY_MOD 100 may be set to 1 and REF_COUNT 102 may be set to 0 at 274 (e.g., indicating that the current entry has not been exported previously), and the operations may end at 276. A pseudo code listing out the steps illustrated in FIGS. 8 and 9 is provided in the following Table 3:

TABLE 3

```
1. void nf_record_encode(nf_template_t *x, nf_exp_entry_t *ent_pt);
2. bool nf_aging_test(nf_age_entry_t *ent_pt);
3. nfe_exp_entry_t nf_exp_entry_get(uint32_t entry_idx);
4. nfe_age_entry_t nf_age_entry_get(uint32_t entry_idx);
5. void nf_key_byte_copy(nfe_exp_entry_t ep, nfe_age_entry_t ap);
6. void nf_NON KEY_byte_copy(nfe_exp_entry_t ep,
    nfe_age_entry_t ap);
7. bool nf_key_byte_same(nfe_exp_entry_t ep, nfe_age_entry_t ap);
8. void nf_exporting_ent(nf_exp_entry_t *ent_pt)
9. {
10.     nfe_age_entry_t *age_pt = NULL;
11.     if (0 == ent_pt->NON_KEY_MOD) return;
12.     age_pt = nf_age_entry_get(ent_pt->ENTRY INDEX);
13.     if (NULL == age_pt) {
14.         ent_pt->KEY_MOD = 1;
15.     } else {
16.         if (true == nf_key_byte_same(ent_pt, age_pt)) {
17.             ent_pt->KEY_MOD = 0;
18.         } else {
19.             ent_pt->KEY_MOD = 1;
20.         }
21.     }
22.     if (0 == ent_pt->KEY_MOD) {
23.         if (0 == (ent_pt->
                REF_COUNT%MAX_T_ENC_RECORD)) {
24.             nf_record_encode(Tdic, ent_pt);
25.         } else {
26.             nf_record_encode(Tenc, ent_pt);
27.         }
28.     } else {
29.         if (0 == (ent_pt->
                REF_COUNT%MAX_T_ENC_RECORD)) {
30.             nf_record_encode(T, ent_pt);
31.         } else {
32.             nf_record_encode(Tenc, ent_pt);
33.         }
34.     }
35.     ent_pt->REF_COUNT = ent_pt->REF_COUNT + 1;
36.     ent_pt->NON_KEY_MOD = 0;
37. }
38. void nf_aging_ent(nf_age_entry_t *ent_pt)
39. {
40.     nfe_exp_entry_t *exp_pt = NULL;
41.     if (true == nf_aging_test(ent_pt)) {
42.         exp_pt = nf_exp_entry_get(ent_pt->ENTRY INDEX);
43.         if (NULL != exp_pt) {
```

TABLE 3-continued

```
44.          if (true == nf_key_byte_same(exp_pt, ent_pt)) {
45.              exp_pt->KEY_MOD = 0;
46.              nf_exporting_ent(exp_pt);
47.              exp_pt->NON_KEY_MOD = 1;
48.              nf_NON KEY_byte_copy(exp_pt, ent_pt);
49.          } else {
50.              nf_exporting_ent(exp_pt);
51.              nf_key_byte_copy(exp_pt, ent_pt);
52.              nf_NON KEY_byte_copy(exp_pt, ent_pt);
53.              exp_pt->KEY_MOD = 1;
54.              exp_pt->REF_COUNT = 0;
55.              exp_pt->NON_KEY_MOD = 1;
56.          }
57.      } else {
58.          nf_key_byte_copy(exp_pt, ent_pt);
59.          nf_NON KEY_byte_copy(exp_pt, ent_pt);
60.          exp_pt->KEY_MOD = 1;
61.          exp_pt->REF_COUNT = 0;
62.          exp_pt->NON_KEY_MOD = 1;
63.      }
64.  }
65. }
```

Turning to FIG. 10, FIG. 10 is a simplified diagram illustrating data records with and without key byte compression. Example data records 30(1) and 30(2) are encoded according to host template 50. Both data records 30(1) and 30(2) indicate the same template ID 70 (e.g., template ID 70(1)=template ID 70(2)=256), and fields 1, 2, 3 and 4, and different fields 5, 6, and 7. Fields 1, 2, 3 and 4 are key fields 90, whereas fields 5, 6 and 7 are non-key fields 92. Non-key bytes in data record 30(1) are: field 5=16318 bytes; field 6=0x00002233; field 7=0x00003355. In addition, non-key bytes in data record 30(2) are: field 5=32636 Bytes; field 6=0x00003366; field 7=0x00004455. Note that both data records 30(1) and 30(2) contain the same number of fields, according to host template 50, indicating that there is no key byte compression.

In addition, example data records 30(3) and 30(4) are encoded according to dictionary template 52 and encoding template 54, respectively. Template ID 70(3) of data record 30(3) indicates the example ID (258) of dictionary template 52, whereas template ID 70(4) of data record 30(4) indicates the example ID (259) of encoding template 54. In addition to the identical fields of data record 30(1), data record 30(3) includes an additional field 8 indicating ENTRY INDEX 38. Data record 30(4) is compressed and encoded according to encoding template 54. Data record 30(4) contains four fields, lesser than the seven fields of host template 50 (e.g., data records 30(1) and 30(2)), or dictionary template 52 (e.g., data record 30(3)). Note that data record 30(4) indicates how data record 30(2) would look like if encoded according to encoding template 54. Field 4 in data record 30(4) indicates KEY ENTRY INDEX 40, which is the same as field 8 in data record 30(3), indicating ENTRY INDEX 38.

When decode module 24 receives data record 30(3), it reads template ID 70(3) to determine that the encoding is according to dictionary template 52. Decode module 24 may store substantially all key bytes of data record 30(3) as dictionary 74 in storage 18. When decode module 24 receives data record 30(4), it reads template ID 70(4) to determine that the encoding is according to encoding template 54. Decode module 24 may further determine the corresponding flow from the value of KEY ENTRY INDEX 40 in field 4. Decode module 24 may retrieve dictionary 74, and replace KEY ENTRY INDEX 40 in field 4 with key bytes from dictionary 74 having the corresponding ENTRY INDEX value.

Figure 11:
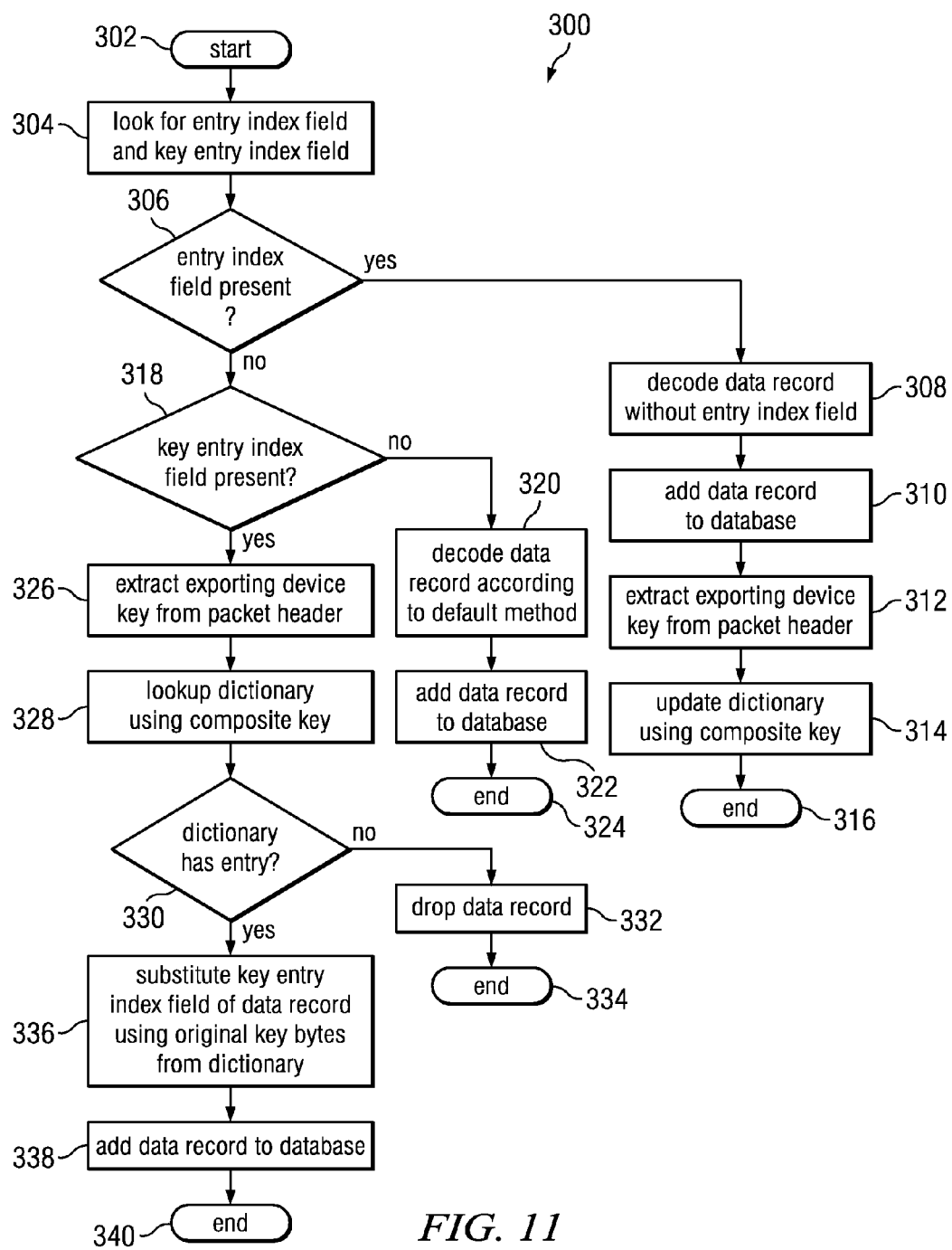
FIG. 11 is a simplified flow diagram illustrating example operations that may be associated with embodiments of the system.

Turning to FIG. 11, FIG. 11 is a simplified flow diagram illustrating example operational activities that may be associated with decompressing data record 30 according to embodiments of communication system 10. Operations 300 may start at 302, when decode module 24 receives data record 30 from exporter 14. At 304, decode module 24, through dictionary module 60, may look for ENTRY INDEX 38 and KEY ENTRY INDEX 40. A determination may be made at 306 whether ENTRY INDEX 38 is present in data record 30.

If ENTRY INDEX 38 is present (indicating encoding according to dictionary template 52), data record 30 may be decoded at 308 without considering the ENTRY INDEX value. At 310, data record 30 may be added to a database in storage 18 (e.g., database that collects data records and keeps track of traffic information). At 312, device key 72 corresponding to exporter 14 may be extracted from the packet header of data record 30. A composite key, comprising template ID 70, device key 72, and ENTRY INDEX 38 may be used to update dictionary 74 at 314. The operations may end at 316.

In addition, if ENTRY INDEX 38 is not present (indicating encoding according to host template 50 or encoding template 54), a determination may be made at 318 whether KEY ENTRY INDEX 40 is present in data record 30. If KEY ENTRY INDEX 40 is not present (indicating encoding according to host template 50), data record 30 may be decoded according to default methods at 320, and data record 30 may be added to the database in storage 18 at 322. The operations may end at 324.

Turning back to 318, if KEY ENTRY INDEX 40 is present (indicating encoding according to encoding template 54), device key 72 corresponding to exporter 14 may be extracted from the packet header of data record 30 at 326. At 328, the composite key comprising template ID 70, device key 72 and KEY ENTRY INDEX 40 (whose value is the same as ENTRY INDEX 38) may be used to lookup dictionary 74. If dictionary 74 does not have a corresponding entry (e.g., comprising key bytes), data record 30 may be dropped at 332 and the operations may end at 334. In addition, if dictionary 74 has the entry, KEY ENTRY INDEX 40 in data record 30 may be substituted using original key bytes from dictionary 74. At 338, data record 30 may be added to the database in storage 18 and the operations may end at 340.

Figure 12:
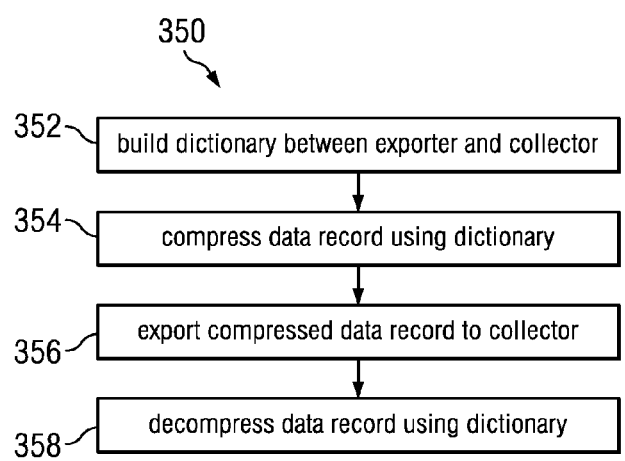
FIG. 12 is a simplified flow diagram illustrating other example operations that may be associated with embodiments of the system.

Turning to FIG. 12, FIG. 12 is a simplified flow diagram illustrating example operational activities that may be associated with embodiments of communication system 10. Operations 350 include building dictionary 74 between exporter 14 and collector 16 at 352. In various embodiments, building dictionary 74 may include encoding data record 30(1) according to dictionary template 52 at exporter 14, and exporting encoded data record 30(1) to collector 16. Dictionary 74 may include ENTRY INDEX 38 and key bytes in data record 30(1). At 354, data record 30(2) may be compressed using dictionary 74. For example, key bytes in data record 30(2), which have been built into dictionary 74 from data record 30(1), may be replaced by KEY ENTRY INDEX 40. At 356, compressed data record 30(2), encoded according to encoding template 54, may be exported to collector 16. At 358, collector 16 (and/or analyzer 20) may decompress data record 30(2) using dictionary 74. For example, KEY ENTRY INDEX 40 in compressed data record 30(2) may be replaced with original key bytes from data record 30(1) in dictionary 74.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, exporter 14 and collector 16. In some embodiments, one or more of these features may be implemented in hardware, provided external to these elements, or consolidated in any appropriate manner to achieve the intended functionality. The various network elements (e.g., exporter 14, collector 16, analyzer 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, exporter 14, collector 16 and analyzer 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 34, 64) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., 32, 62) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   building a dictionary between an exporter and a collector by encoding a first data record of a flow according to a dictionary template at the exporter and exporting the first data record to the collector via a network communication, wherein the exporter collects information about network packets flowing through a network, formats the information into flow records, and exports the collected information to the collector, each flow record comprising a template record and a data record whose format is indicated by the template record, wherein the dictionary template includes a plurality of fields indicative of the flow;

compressing a second data record of the flow using the dictionary, wherein the compressing comprises encoding the second data record according to an encoding template comprising fewer fields than the dictionary template; and exporting the second data record to the collector to be decompressed using the dictionary.

2. The method of claim 1, wherein the dictionary includes a dictionary template comprising a plurality of key fields, a plurality of non-key fields, and an entry index field, and wherein the encoding template comprises the plurality of non-key fields and a key entry index field.

3. The method of claim 2, wherein the encoding of the first data record comprises:

populating the plurality of key fields, the plurality of non-key fields and the entry index field with a plurality of key bytes, a first plurality of non-key bytes, and an entry index value, respectively, and wherein the encoding of the second data record comprises populating the plurality of non-key fields and the key entry index value field with a second plurality of non-key bytes and a key entry index value.

4. The method of claim 2, wherein the entry index value and the key entry index value are calculated from a hash of selected key bytes such that the key entry index value is equal to the entry index value.

5. The method of claim 2, wherein the collector is configured for:

determining that the first data record is encoded according to the dictionary template;

extracting a device key from the first data record; and updating the dictionary using a composite key comprising the device key, a template identification (ID) identifying the dictionary template, and the entry index value, wherein the updating comprises adding the plurality of key bytes to the dictionary.

6. The method of claim 5, wherein the collector is further configured for:

determining that the second data record is encoded according to the encoding template;

extracting the device key from the second data record;

accessing the dictionary using another composite key comprising the device key, a template ID identifying the encoding template, and the key entry index value; and substituting the key entry index value with the plurality of key bytes from the dictionary.

7. The method of claim 2, further comprising:

checking if a first entry in an aging table is to be aged out according to an aging criterion, wherein the first entry comprises the plurality of key bytes, a first plurality of non-key bytes, and the entry index value;

if the first entry is to be aged out,
  copying the first entry to an exporting table;
  adding a first non-key field, a second non-key field, and a third non-key field to the first entry in the exporting table, wherein the first non-key field is set to 1, the second non-key field is set to 1, and the third non-key field is set to 0;
  exporting the first entry to the collector; and
  setting the second non-key field to 0 after exporting.

8. The method of claim 1, further comprising:

determining if the dictionary is to be updated at the collector; and if the dictionary is to be updated at the collector, encoding a first entry in an aging table into the first data record before exporting.

9. The method of claim 1, further comprising:

checking if a first entry in an aging table is to be aged out according to aging criterion, wherein the first entry comprises the plurality of key bytes, a first plurality of non-key bytes, and the entry index value;

if the first entry is to be aged out,
  checking if a peer entry having the entry index value exists in the exporting table;
  if the peer entry exists,
    copying the first plurality of non-key bytes from the first entry to the peer entry;
    setting a first non-key field and a second non-key field in the peer entry to 0 and 1, respectively; and
    exporting the peer entry to the collector.

10. The method of claim 9, further comprising:

encoding the peer entry into the second data record before exporting.

11. Logic encoded in non-transitory media that includes instructions for execution and when executed by a processor, is operable to perform operations comprising:

building a dictionary between an exporter and a collector by encoding a first data record of a flow according to a dictionary template at the exporter and exporting the first data record to the collector via a network communication, wherein the exporter collects information about network packets flowing through a network, formats the information into flow records, and exports the collected information to the collector, each flow record comprising a template record and a data record whose format is indicated by the template record, wherein the dictionary template includes a plurality of fields indicative of the flow;

compressing a second data record of the flow using the dictionary, wherein the compressing comprises encoding the second data record according to an encoding template comprising fewer fields than the dictionary template; and exporting the second data record to the collector to be decompressed using the dictionary.

12. The logic of claim 11, wherein the dictionary includes a dictionary template comprising a plurality of key fields, a plurality of non-key fields, and an entry index field, and wherein the encoding template comprises the plurality of non-key fields and a key entry index field.

13. The logic of claim 12, wherein the encoding of the first data record comprises:

populating the plurality of key fields, the plurality of non-key fields and the entry index field with a plurality of key bytes, a first plurality of non-key bytes, and an entry index value, respectively, and wherein the encoding of the second data record comprises populating the plurality of non-key fields and the key entry index value field with a second plurality of non-key bytes and a key entry index value.

14. The logic of claim 13, wherein the collector is configured for:

determining that the first data record is encoded according to the dictionary template;

extracting a device key from the first data record; and updating the dictionary using a composite key comprising the device key, a template identification (ID) identifying the dictionary template, and the entry index value, wherein the updating comprises adding the plurality of key bytes to the dictionary.

15. The logic of claim 14, wherein the collector is further configured for:
- determining that the second data record is encoded according to the encoding template;
- extracting the device key from the second data record;
- accessing the dictionary using another composite key comprising the device key, a template ID identifying the encoding template, and the key entry index value; and
- substituting the key entry index value with the plurality of key bytes from the dictionary.

16. An apparatus, comprising:
- a memory element for storing data; and
- a processor that executes instructions associated with the data, wherein the processor and the memory element cooperate, such that the apparatus is configured for:
  - building a dictionary between an exporter and a collector by encoding a first data record of a flow according to a dictionary template at the exporter and exporting the first data record to the collector via a network communication, wherein the exporter collects information about network packets flowing through a network, formats the information into flow records, and exports the collected information to the collector, each flow record comprising a template record and a data record whose format is indicated by the template record, wherein the dictionary template includes a plurality of fields indicative of the flow;
  - compressing a second data record of the flow using the dictionary, wherein the compressing comprises encoding the second data record according to an encoding template comprising fewer fields than the dictionary template; and
  - exporting the second data record to the collector to be decompressed using the dictionary.

17. The apparatus of claim 16, wherein the dictionary includes a dictionary template comprising a plurality of key fields, a plurality of non-key fields, and an entry index field, and wherein the encoding template comprises the plurality of non-key fields and a key entry index field.

18. The apparatus of claim 17, wherein the encoding of the first data record comprises:
- populating the plurality of key fields, the plurality of non-key fields and the entry index field with a plurality of key bytes, a first plurality of non-key bytes, and an entry index value, respectively, and wherein the encoding of the second data record comprises populating the plurality of non-key fields and the key entry index value field with a second plurality of non-key bytes and a key entry index value.

19. The apparatus of claim 17, wherein the collector is configured for:
- determining that the first data record is encoded according to the dictionary template;
- extracting a device key from the first data record; and
- updating the dictionary using a composite key comprising the device key, a template identification (ID) identifying the dictionary template, and the entry index value, wherein the updating comprises adding the plurality of key bytes to the dictionary.

20. The apparatus of claim 19, wherein the collector is further configured for:
- determining that the second data record is encoded according to the encoding template;
- extracting the device key from the second data record;
- accessing the dictionary using another composite key comprising the device key, a template ID identifying the encoding template, and the key entry index value; and
- substituting the key entry index value with the plurality of key bytes from the dictionary.

* * * * *